United States Patent
Malone

(10) Patent No.: US 6,517,724 B1
(45) Date of Patent: *Feb. 11, 2003

(54) AIR CHARGED BACKWASHING BIOCLARIFIER

(76) Inventor: Ronald F. Malone, 3218 Riverwalk Dr., Baton Rouge, LA (US) 70820

( * ) Notice: Subject to any disclaimer, the term of this patent is extended or adjusted under 35 U.S.C. 154(b) by 0 days.

This patent is subject to a terminal disclaimer.

(21) Appl. No.: 09/928,697

(22) Filed: Oct. 22, 1999

Related U.S. Application Data

(63) Continuation-in-part of application No. PCT/US98/07732, filed on Apr. 16, 1998.

(51) Int. Cl.⁷ .................................................. C02F 3/06
(52) U.S. Cl. ...................... 210/618; 210/786; 210/151; 210/274; 210/279; 210/793
(58) Field of Search ................... 210/618, 739, 210/741, 786, 792–798, 150, 151, 108, 121, 129, 274, 275, 276, 277, 279, 410, 411

(56) References Cited

U.S. PATENT DOCUMENTS

| | | | |
|---|---|---|---|
| 887,069 A | 5/1908 | Cotter | |
| 2,464,707 A | 3/1949 | Montgomery et al. | 210/151 |
| 3,154,601 A | 10/1964 | Kalinske et al. | 210/150 |
| 3,819,054 A | 6/1974 | Long et al. | 210/199 |
| 3,956,128 A | 5/1976 | Turner | 210/150 |
| 4,009,099 A | 2/1977 | Jeris | 210/151 |
| 4,009,105 A | 2/1977 | Jeris | 210/151 |
| 4,036,854 A | 7/1977 | Chang | 260/343.2 |
| 4,052,300 A | 10/1977 | Mosso | 210/20 |
| 4,198,301 A | 4/1980 | Iwatani | 210/274 |
| 4,415,454 A | 11/1983 | Fuchs | 210/616 |
| 4,432,721 A | 2/1984 | Evans et al. | 261/123 |
| 4,547,286 A | 10/1985 | Hsiung | 210/738 |
| 4,566,971 A | 1/1986 | Reimann et al. | 210/151 |
| 4,576,718 A | 3/1986 | Reischi et al. | 210/616 |
| 4,582,600 A | 4/1986 | Atkinson et al. | 210/205 |
| 4,608,181 A | 8/1986 | Hsiung et al. | 210/786 |
| 4,743,382 A | 5/1988 | Williamson et al. | 210/786 |
| 4,842,744 A | 6/1989 | Schade | 210/636 |
| 4,865,734 A | 9/1989 | Schulz | 210/279 |
| 4,885,083 A | 12/1989 | Banks | 210/274 |
| 4,898,672 A | 2/1990 | Clifft et al. | 210/614 |
| 4,919,815 A | 4/1990 | Copa et al. | 210/605 |
| 5,009,776 A | 4/1991 | Banks | 210/274 |
| 5,030,353 A | 7/1991 | Stuth | 210/618 |
| 5,126,042 A | 6/1992 | Malone | 210/151 |
| 5,227,051 A | 7/1993 | Oshima | 210/150 |
| 5,232,586 A | 8/1993 | Malone | 210/151 |
| 5,445,740 A | 8/1995 | Malone | 210/618 |
| 5,573,663 A | 11/1996 | Junius et al. | 210/189 |
| 5,618,431 A | 4/1997 | Kondo et al. | 210/618 |

FOREIGN PATENT DOCUMENTS

| | | | |
|---|---|---|---|
| DE | 903800 | 8/1962 | |
| GB | 120867 | 11/1918 | 210/274 |

Primary Examiner—Christopher Upton
(74) Attorney, Agent, or Firm—Jones, Walker, Waechter, Poitevent, Carrere & Denegre, L.L.P.

(57) ABSTRACT

The present invention provides a floating media biofilter having an economical structure which allows energy efficient and water conserving backwashing of the floating media. The biofilter includes a filter chamber fluidly connected to a charge chamber which is adapted for accumulating air. A trigger device positioned between the charge chamber and filter chamber selectively allows the flow of air from said charge chamber to said filter chamber. An air source is connected to the charge chamber and slowly supplies air thereto. The backwash cycle is initiated by the trigger device allowing air to escape from the charge chamber into the filter chamber and agitate the floating media. Simultaneously, water from the filter chamber flows into the charge chamber. After the trigger device closes, air again accumulates in charge chamber in preparation for another backwash cycle.

85 Claims, 24 Drawing Sheets

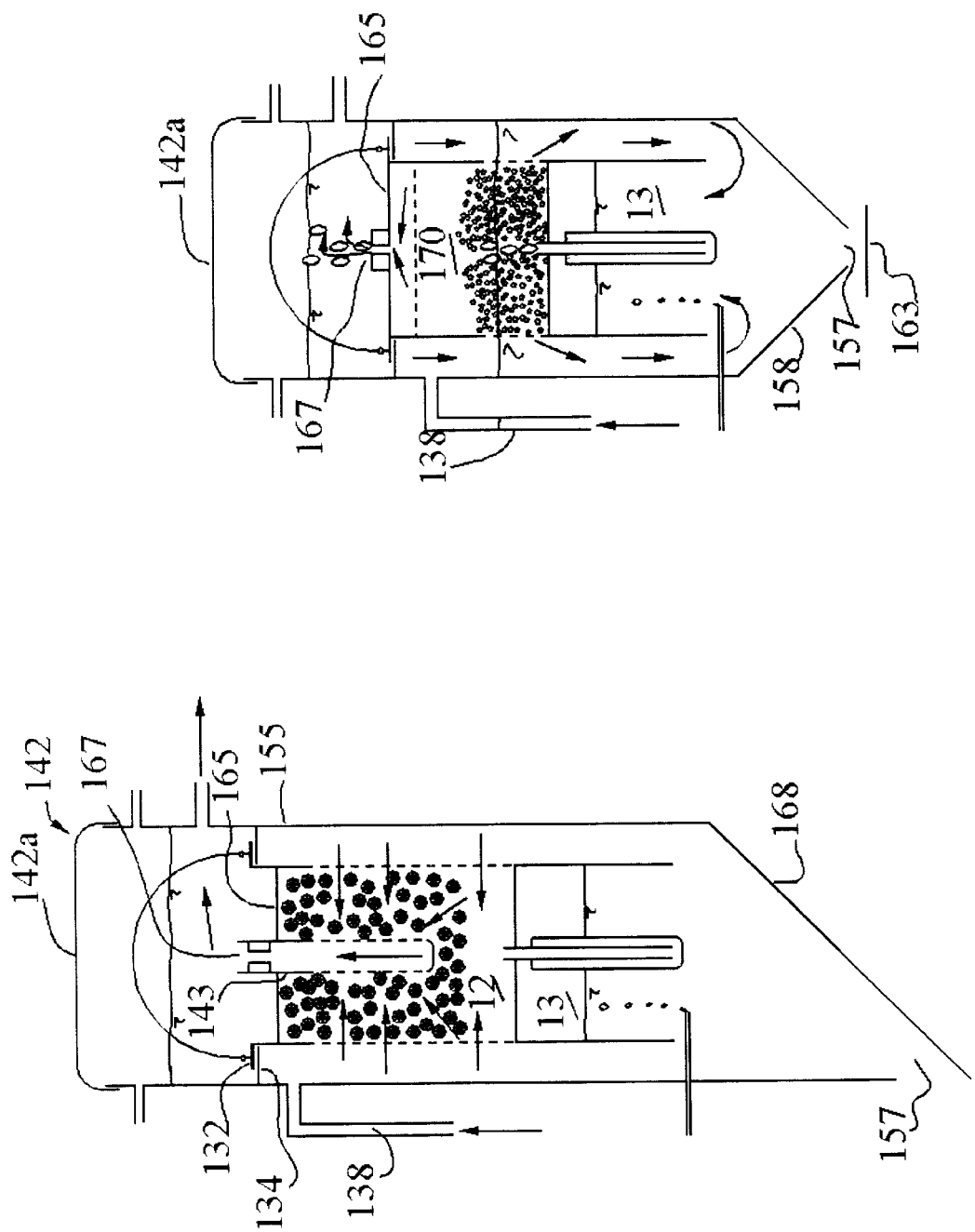

AIR CHARGED BACKWASHING BIOCLARIFIER

This is a continuation-in-part application claiming priority to PCT/US98/07732 filed Apr. 16, 1998 which claimed priority to U.S. Ser. No. 08/842,241, filed on Apr. 23, 1997 and issued as U.S. Pat. No. 5,770,080 on Jun. 23, 1998.

BACKGROUND OF THE INVENTION

I. Field of the Invention

This invention relates generally to wastewater treatment systems which physically and biologically treat wastewater and, more particularly, to treatment systems which use floating filter media to physically and biologically treat wastewater.

II. Description of Prior Art

In high density aquaculture systems used for the production of aquatic animals such as catfish, tilapia, alligators, and clams, and in other water systems which generate wastewater, it is necessary to remove suspended solids, optimize nitrification and to reduce biochemical oxygen demand (BOD) of the wastewater. In all cases, treated water is eventually returned to the ecosystem, whether the return is to a lake or stream or back to a controlled aquaculture system. Varying load and flow conditions make operation of waste treatment systems difficult, in that the timing of treatment steps is dependent upon such changing conditions.

In the operation of any wastewater treatment system, it is desirable to waste as little water as possible and to maximize the concentration of waste sludge accumulated by the system. This is especially true in high density aquaculture systems, where constant recirculation of water is necessary, and it becomes even more important to minimize the amount of water wasted in the treatment process. Water loss also becomes critically important when the waste water volume approaches the volume of the aquaculture system being treated, such as in aquaria used in pet stores and research labs. The principal problems with high water loss in any aquaculture system are: 1) the costs of treating high volumes of the backwashed waters, 2) in warm water aquaculture systems, heat losses due to release of the backwash water, 3) increased water demands and pretreatment costs, 4) high capital costs for pumps and other equipment whose size is dictated by peak water demands, and 5) high costs of replacing synthetic salts lost through backwashing a system being used in a marine (i.e. saltwater) application.

Most prior art systems accomplish treatment using various traditional treatment components, such as aeration basins, filters and clarifier units, with each component having its own treatment and energy consumption limitations. A system which efficiently combines the features of separate component systems would have greater advantages over those presently in use.

Three known filters which overcome most of these problems are the biofilters disclosed in U.S. Pat. No. 5,126,042, U.S. Pat. No. 5,232,586, and U.S. Pat. No. 5,445,740, all issued to the inventor herein, Dr. Ronald F. Malone (hereinafter "Malone I", "Malone II", and "Malone III" respectively). Malone I uses a tank having sidewalls which are inwardly sloping toward the bottom, wherein a floating media pack is caused to form near the top of the tank when it is filled with liquid during filtration. A high-speed, propeller-type agitator is employed to fluidize and expand the media pack and break up the filtered matter prior to backwashing the system. A drain line is opened near the bottom of the tank to allow accumulated sludge to leave the tank, and an outlet line is provided immediately above the media pack. Malone III is similar to Malone I, but uses slowly rotating paddles to gently fluidize and expand the media pack rather than the high speed propellers of Malone I.

Malone II employs a tank having an upper filtration chamber and a lower expansion chamber fluidically connected to each other by a constricted passageway. An inlet line supplies water to the tank through the lower chamber, while a floating media pack forms within the upper chamber during filtration. As in Malone I, an outlet line is connected to the tank above the media pack and delivers filtered water back to the aquatic environment. Contrary to Malone I, however, backwashing is accomplished by the displacement and expansion of the media pack through the constricted passageway. The turbulence of this expansion causes the filtered matter and sludge to fall toward a drain line located at the bottom of the tank. In most embodiments of Malone II, the backwashing method results in large water losses as compared to the methods of Malone I and III.

While these devices are well-suited to accomplishing the objectives stated in those patents, there still remain certain disadvantages inherent is these and other prior art systems. Periodic backwashing is a necessity for all expanding media filters and in many applications 5 or 6 backwashes per day is recommended. The prior art generally requires water to be flushed or removed from the tank during each backwashing operation. The backwashing water generally exits through a sludge line, is intermixed with the sludge and must be treated by a separate process before being released into the environment. This results in water being lost from the system under filtration and higher costs incurred in disposing of sludge mixed backwash water. As alluded to above, this water loss is particularly costly where the biofilter is used in a marine application since marine applications often employ water reconditioned with synthetic salts. In many instances, the costs of synthetic salts may make the replacement of reconditioned water lost in backwashing cost prohibitive. For example, most of the Malone II type biofilters may lose between 10 and 15 gallons of water for every cubic foot of filter media contained in the biofilter. While Malone I and III backwash with less water loss than Malone II (2–5 gallons per cubic foot of filter media), Malone I and III generally employ metal components in the structure supporting the propellers or paddles. In a marine environment, this structure is highly susceptible to corrosion by the salt water.

Furthermore, the prior art biofilters typically require the opening and closing of different valves during the backwashing process. For example, the influent and effluent lines are general closed and the sludge line opened during backwashing operations. While this is often automated to avoid tedious manual operation of the valves, the automating equipment is a significant part of the total cost of the biofilter. Automation of backwashing also includes the risks associated with a failure of the automating equipment. For example, automated backwashing systems generally include an automated ball valve. If the ball valve fails in the open position, it is possible that the whole system could be siphoned out through the sludge line. Finally, prior art systems like Malone I and III required motorized equipment to fluidize the filter media during backwashing, further adding to the costs of producing these types of biofilters.

Because of the energy required to backwash and the loss of water occurring during each backwashing operation, there is a practical limit in the prior art on how often a biofilter may be backwashed. In turn, less frequent backwashing leads to other problems and disadvantages. Less frequent backwashing allows more solids to accumulate in the filter media and adversely impact the nitrification rate of ammonia. Since ammonia is toxic to fish life, it is important in aquaculture systems to reduce the $NH_4$ and $NH_3$ (collectively known as Total Ammonia Nitrogen or TAN) to nitrite ($NO_2$) and nitrate ($NO_3$). As these solids decay, they both produce ammonia and consume the oxygen which could otherwise be used to reduce ammonia to nitrite and nitrate. Decaying solids also encourage growth of heterotrophic bacteria which compete for space with more desirable autotrophic bacteria. Additionally, the accumulation of solids and the overgrowth of biological floc in the filter media caused by less frequent backwashing increases the influent pressure required (and therefore the pumping capacity required) to force water through the filter media. This head loss caused by insufficiently frequent backwashing also prevents the employment of more efficient pumping technologies such as air lift pumps. Air lift pumps are far more economical to build and operate than convention pumps, but have limited lifting capacity making them impractical for use with prior art biofilters. However, if a system was developed which rendered frequent backwashing economical, the head loss across the filter media could be kept sufficiently low so that air lift pumps could be effectively employed in biofilters.

Another disadvantage found in prior art biofilters is the tendency to experience "blow down turbidity." Blow down turbidity occurs at the end of the backwash cycle and is a result of the fluidization of sediments during backwashing. When the biofilter is returning to the normal filtration stage, a certain amount of turbid water is forced through the effluent outlet before the media can re-form into a compact enough bed to effectively filter the entrained solids.

Finally, certain characteristics of the prior art required the biofilter tank to take on special geometric shapes in order for the biofilter to operate in the most efficient manner. For example, a preferred embodiment of the biofilter in Malone II taught a restriction in the midsection of the tank in order to most efficiently expand the filter media during backwashing.

SUMMARY OF THE INVENTION

Therefore, it is an object of this invention to provide a floating media biofilter which allows backwashing of the media without the loss of water.

It is another object of this invention to provide a floating media biofilter that will allow considerably more frequent backwashing than practical with prior art biofilters.

It is a further object of this invention to provide a floating media biofilter that does not require electro-mechanical valves or other components that are subject to failure.

It is still a further object of this invention to provide a floating media biofilter that is more economical to built and operate than hereto known in the art.

Therefore the present invention provides a tank for a floating media biofilter. The biofilter tank comprises a filter chamber and a charge chamber for intermittently storing air. The charge chamber includes an air outlet for admitting air into said filter chamber, a water inlet, an air inlet, and a trigger for selectively allowing the passage of air through said air outlet.

BRIEF DESCRIPTION OF THE DRAWINGS

FIGS. 13a and 13b illustrate an alternate biofilter used in the treatment system of FIG. 11.

DETAILED DESCRIPTION

Figure 1:
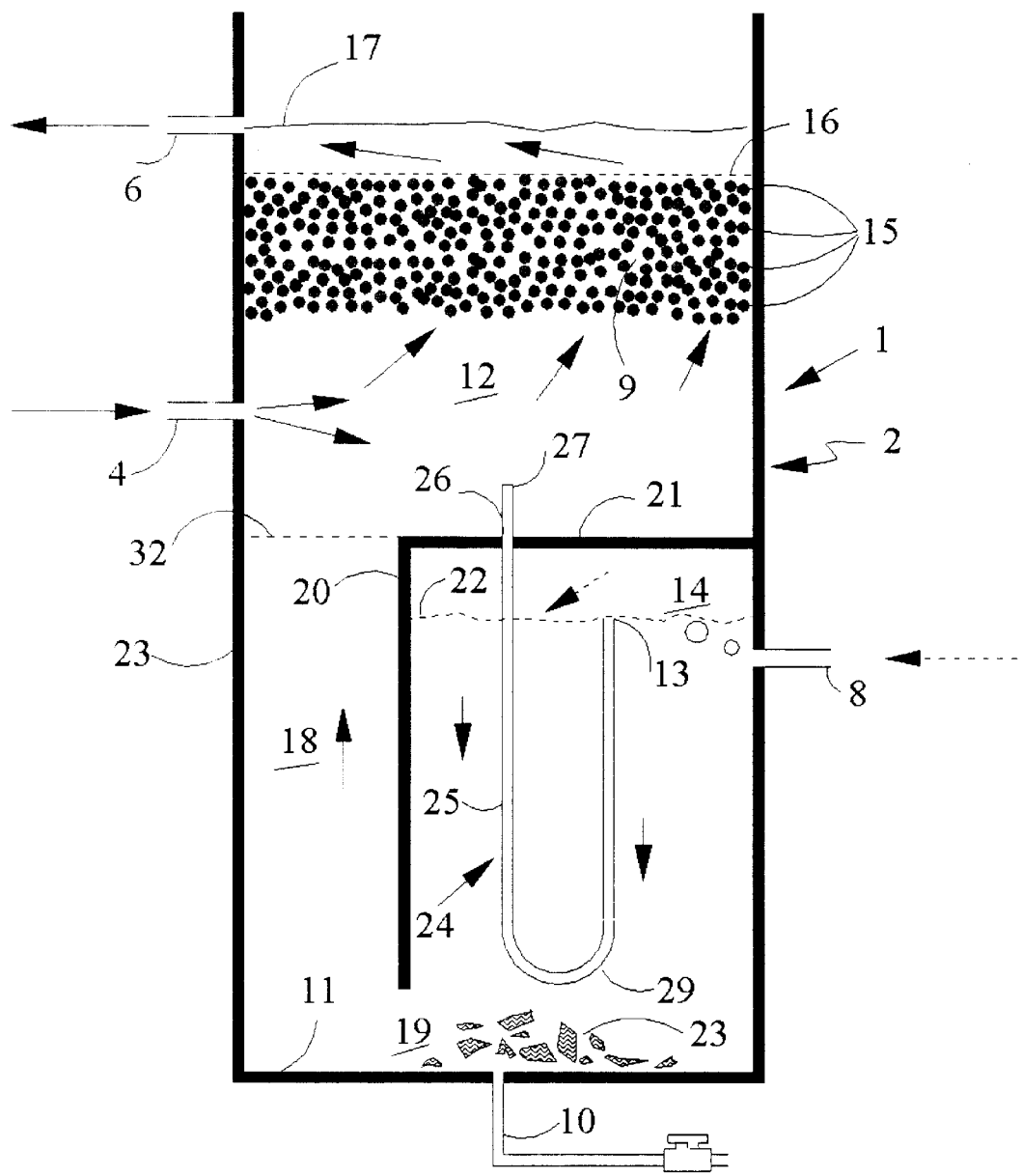
FIG. 1 is a basic embodiment of the biofilter and tank of the present invention illustrating the biofilter at the beginning of its normal operating cycle.

In the drawings many details pertaining to fabrication and maintenance utility well-established in the machine construction art and not bearing upon points of novelty are omitted in the interest of descriptive clarity and efficiency. FIG. 1 illustrates a basic configuration of the floating media biofilter 1 of the present invention. The term "filter" and "biofilter" are used interchangeably throughout this application. It will be understood that in some applications the water treatment is accomplished largely by filtration through the floating media, while in other applications, a large part of the water treatment is accomplished through biological activity of the micro-organisms growing on the floating media. The terms "biofiltration" or "biofilter" are intended to encompass both of these treatment methods, to whatever degree a particular application utilizes either or both of the methods. Biofilter 1 comprises a tank 2 having an wastewater or influent inlet 4, a treated water or effluent outlet 6, and a sludge outlet 10. Tank 2 will further comprise at least two compartments, filter chamber 12 and charge chamber 13. Filter chamber 12 will accommodate a bed 9 of floating filtration media 15. Floating media 15 will preferably comprise multiple low density granular media beads or beads. The beads may be of any suitable material, but plastic is preferred. Low density polyethylene feed stock beads one-eighth inch in diameter have been found to be suitable in experimental units. Different types of beads may be preferable depending on the nature of the wastewater. Rounded, relatively smooth surfaced beads may be preferable in a wastewater heavily loaded with large solids and where the media bed is intended to act primarily as a filter. Because it is expected that the large solids will quickly build up on and between the beads, it is desirable to have comparatively smooth beads which easily shed the solids during backwashing. On the other hand, where the water is comparatively lightly loaded and contains mainly fine particles or soluble organics, these particles and organics are best removed by promoting the growth of micro-organisms or "biofloc." In order to create a protective environment for the biofloc, the media beads may employ a tubular design. The tubular bead provides an interior surface upon which the biofloc may adhere. The interior surface provides a protected space for the biofloc during backwashing and provides for the maximum biofloc growth. These beads may be described as providing protected internal biofloc space and are employed in the biofilter of FIG. 13a.

In situations where the wastewater is heavily loaded with soluble BOD and fine particles, neither of the above described beads perform optimally. Media beds form of smooth rounded beads do not retain fine solids or promote sufficient growth of biofloc. On the other hand, the heavy concentration of soluble BOD tends to provide too much growth in beads having protected internal areas and therefore tends to clog the internal passages of these beads. One solution is a bead having only an external surface, but also having spokes extending from that surface. The spokes provide some protection to the biofloc during backwashing, but also expose excessive amounts of biofloc to removal through the agitation of backwashing. Alternatively, the biofloc may be protected by pockets or dimples formed on the surface of the media. These beads may be described as providing protected external biofloc space and are employed in the biofilter of FIG. 12b. All of the above described media bead types are known in the art and commercially available from suppliers such as Aquaculture Systems Technologies, LLC located at 108 Industrial Ave, Jefferson, La.

Enhanced filtration can also be achieved employing multiple media beds. Multiple media beds consist of media beads of varying size and buoyancy. Typically smaller diameter beads will be made more buoyant than larger diameter beads by altering their specific density in the manufacturing process. Thus the multiple media forms a more efficient, graduated filter, with larger particles being trapped in the lower section of the bed and smaller particles being trap further upper section of the bed.

Floating media 15 will form a media pack 9 when tank 2 is filled with water or other liquid, and when media 15 are left undisturbed. A screen 16 or some other some other water permeable barrier will be positioned between effluent outlet 6 and floating media 15 to prevent the media beads from escaping tank 2 through effluent outlet 6.

Inlet line 4 and outlet line 6 are sized to accommodate flow rates appropriate for the particular application. For example, in aquaculture applications flow rates of about 5–15 gallons per minute (g.p.m.) per cubic foot ($ft^3$) of filter media are generally used assuring that oxygen and ammonia transport rates are matched with the ammonia and biochemical oxygen demand (BOD) loadings. In high substrate regimes associated with wastewater treatment, flow rates are increased into a range of about 20–40 g.p.m./$ft^3$ to avoid oxygen depletion. An alternative method of avoiding oxygen depletion consists of saturating or super-saturating the influent with oxygen prior to its entering the system. Both inlet and outlet lines 4 and 6 may be constructed of any suitable material, such as commercially available polyvinyl chloride (PVC) pipe.

Figure 9:
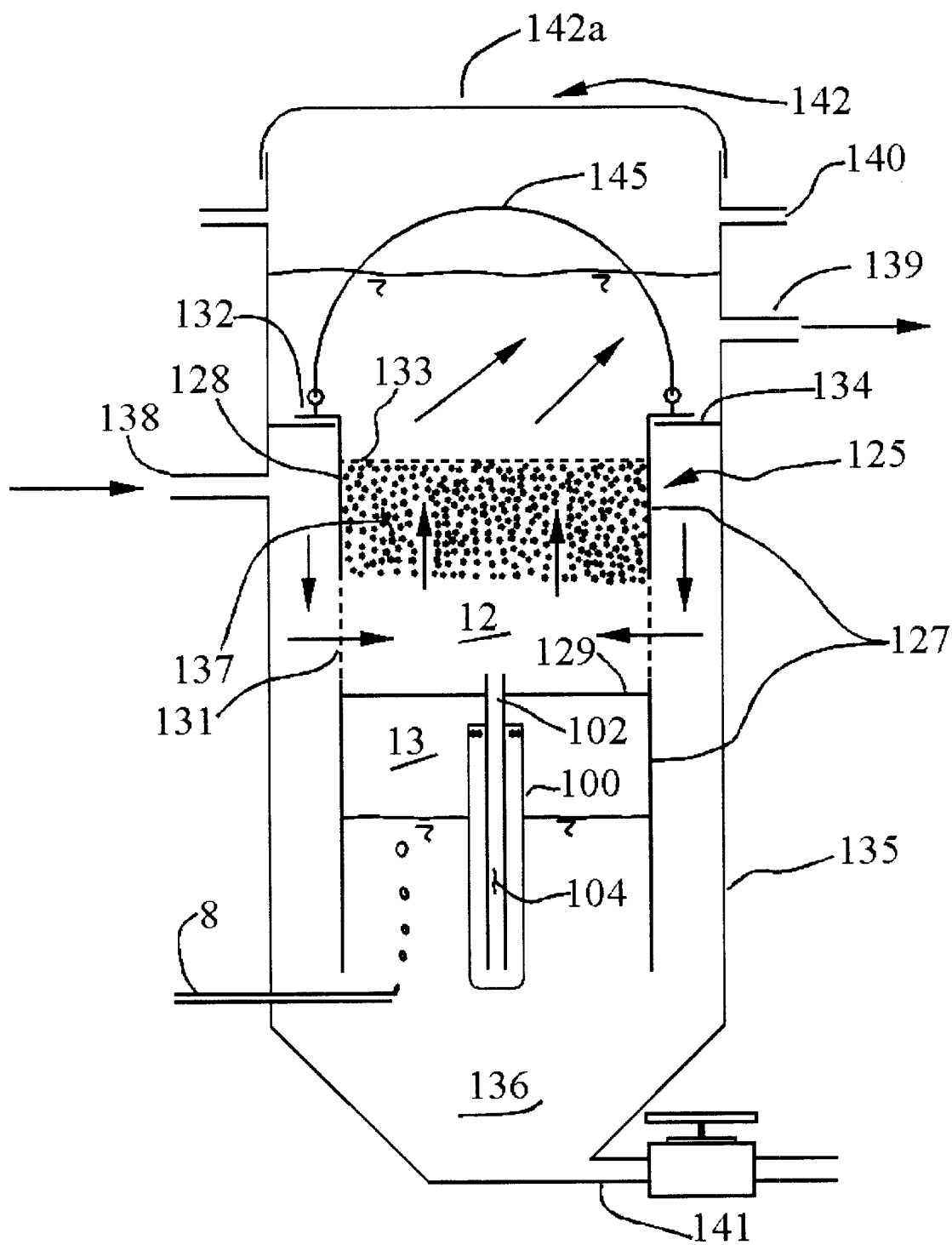
FIG. 9 illustrates a biofilter having a removable filtration module.

Positioned in a lower section of tank 2 is a charge chamber wall 20 defining a charge chamber 13. Charge chamber 13 forms a substantially airtight enclosure along the length of wall 20. Formed between the outside wall 23 of tank 2 and charge chamber wall 20 is a settling area 18 through which water passes before entering charge chamber 13. A subsection of wall 20 will include top wall 21. While not shown in the figures, top wall 21 could be inclined to induce any solids settling on top wall 21 to migrate toward settling area 18 rather than being retained on a basically horizontal top wall 21. It is believed to be most efficient to slope top wall 21 at an angle of 30°–45° from the horizontal. In the embodiment shown in FIG. 1, wall 20 terminates in the approximate vicinity of the bottom 11 of tank 2. Between bottom 11 and wall 20 is water inlet passage 19 which will allow the transfer of water between filter chamber 12 and charge chamber 13 as will be explained in detail below. How closely wall 20 approaches tank bottom 11 will be determined in part by the amount of sludge it is anticipated will accumulate on bottom 11 before being removed through sludge line 10. Typically sludge will be removed between once per day and once per week. Therefore wall 20 must be sufficiently distant from bottom 11 to allow the maximum anticipated volume of sludge to accumulate between removals without the accumulating sludge blocking passage 19. Generally, bottom 11 will form a sludge basin wherein sludge may accumulate until removed through sludge outlet line 10. While sludge basin may take any number of shapes, one preferred embodiment will form sludge basin in a conical shape 136 as seen in FIG. 9. A pellet or "bead" screen 32 is positioned between filtration chamber 12 and passage 19. Bead screen 32 is intended to insure beads do not migrate to charge chamber 13. However, a bead screen 32 is not critical to the function of the biofilter. Since the beads float, it is expected that comparatively few beads will find their way into charge chamber 13 even in the absence of a screen.

An air inlet 8 will communicate with charge chamber 13 in order to allow the introduction of air into charge chamber 13 and an air outlet 26 formed in top wall 21 will allow the transfer of air from charge chamber 13 to filter chamber 12. The term "air" will generally mean the mixture of gases naturally occurring in the atmosphere but could include any gas or combination of gases. A trigger 24 for initiating this transfer of air will be positioned to communicate with the filter chamber 12 and a variable air pocket 14 which will be formed in charge chamber 13 above water level 22. In the embodiment shown in FIG. 1, trigger 24 is a siphon 25 positioned inside of charge chamber 13. A first section of siphon 25 extends through air outlet 26 and has a first opening 27 communicating with filter chamber 12. A second section of siphon 25 has an opening communicating with variable air pocket 14 in the interior space of charge chamber 13 and the lowermost section of siphon 25 has a bend 29.

Operation of Biofilter

As seen in FIG. 1, biofilter 1 is operating in the normal filtration mode. Influent enters tank 2 through inlet line 4 and is delivered to tank 2 by a pump or any other means capable of lifting the water to the top of tank 2 so that effluent may exit through outlet line 6. During treatment, biological growth forms a film on each pellet of filtration media 15 of media bed 9, which in turn provides nitrification and BOD reduction. Suspended solids removed by media bed 9, as well as biofloc, form a floc, some of which falls from media bed 9 and settles on top wall 21 and in the lower sections of tank 2, forming sludge 23. During the filtration stage, the floc on media bed 9, over a period of time, will tend to bridge from pellet to pellet, requiring periodic agitation of the media bed 9 (referred to as "fluidization") to loosen solids for removal. Such fluidization is achieved during the backwashing stage of operation which is explained further below.

Figure 2:
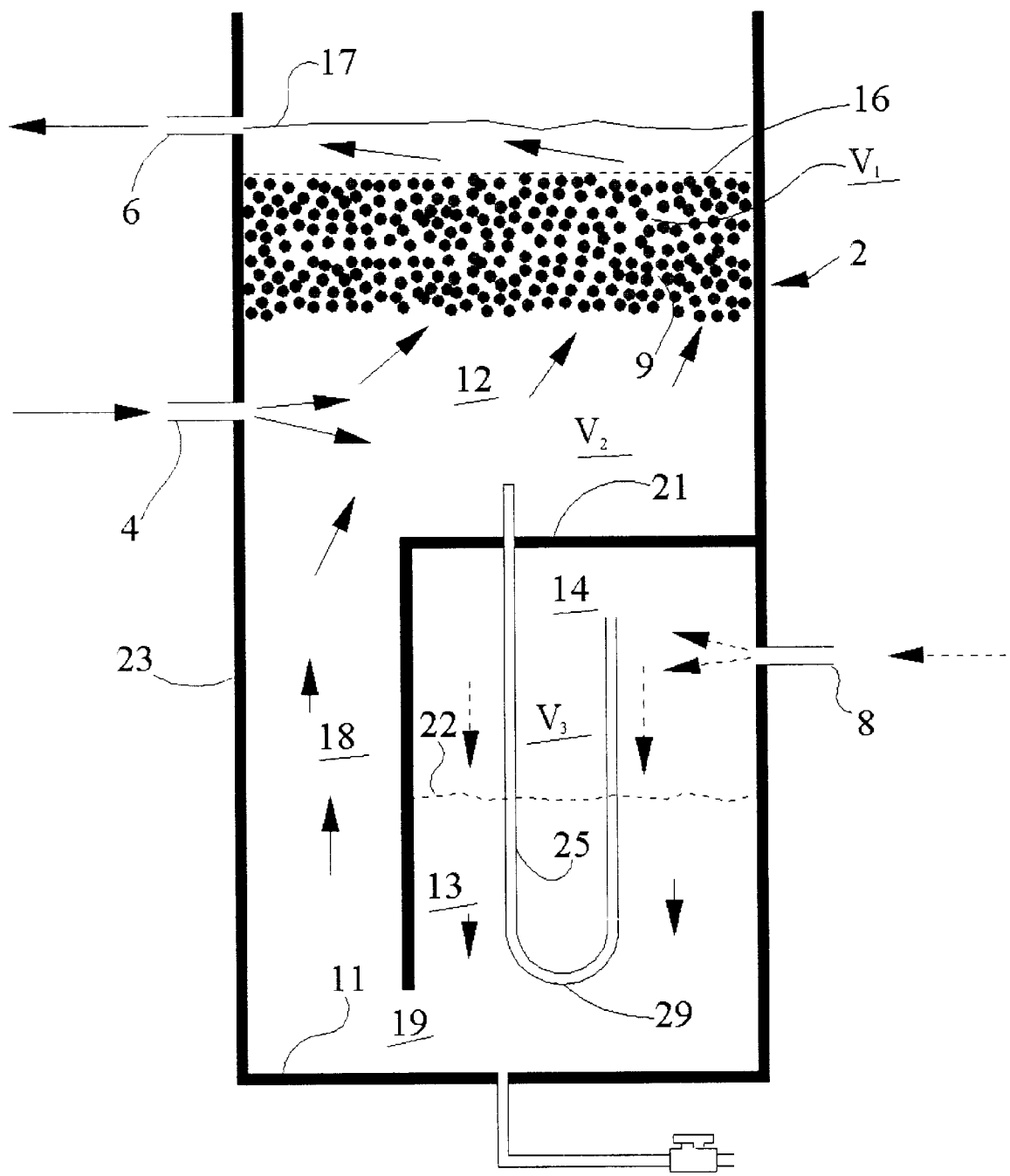
FIG. 2 illustrates the biofilter at an intermediate stage of operation with the charge chamber half-filled with air.
Figure 3:
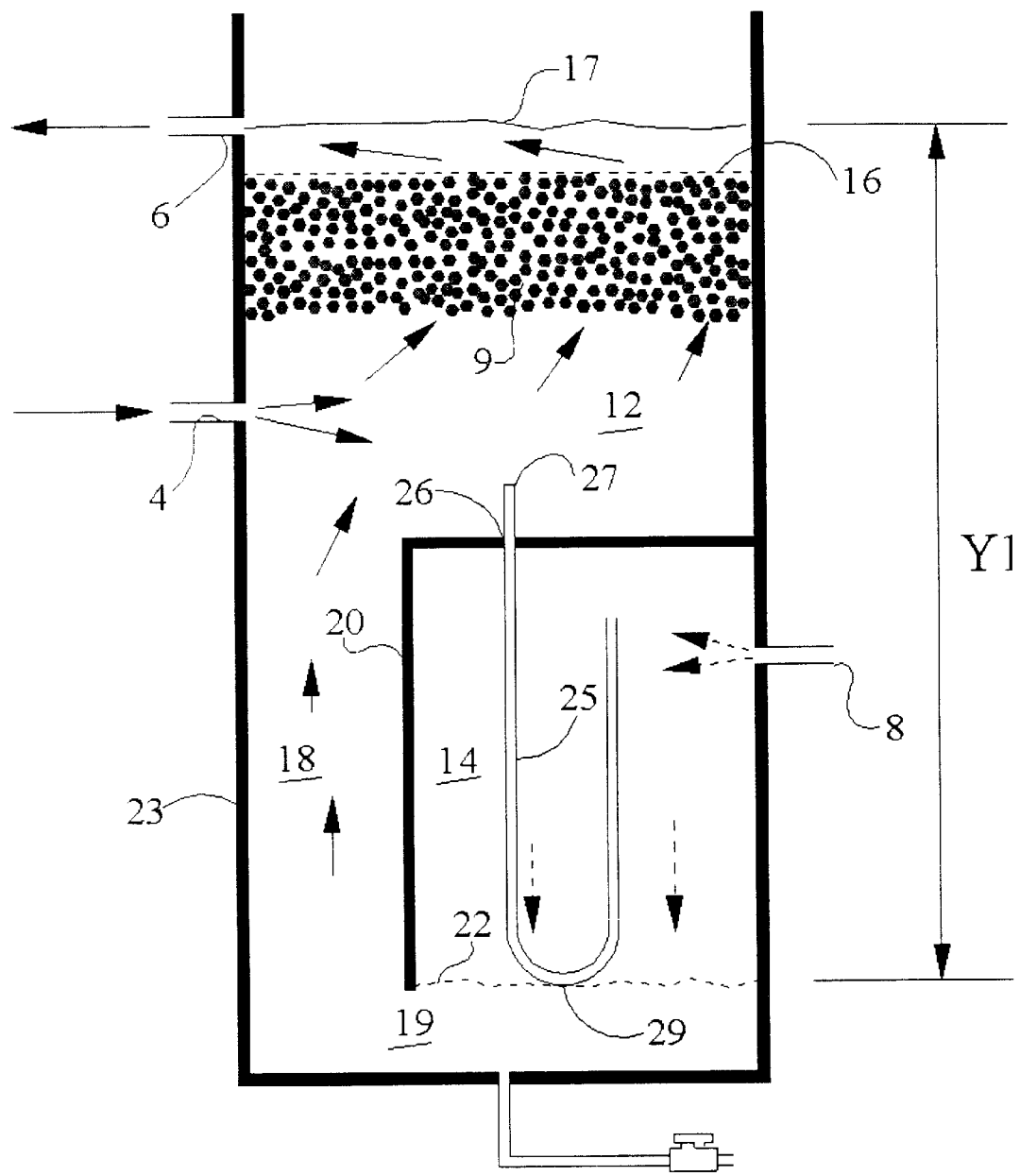
FIG. 3 illustrates the biofilter just prior to beginning the backwash stage of operation.
Figure 4:
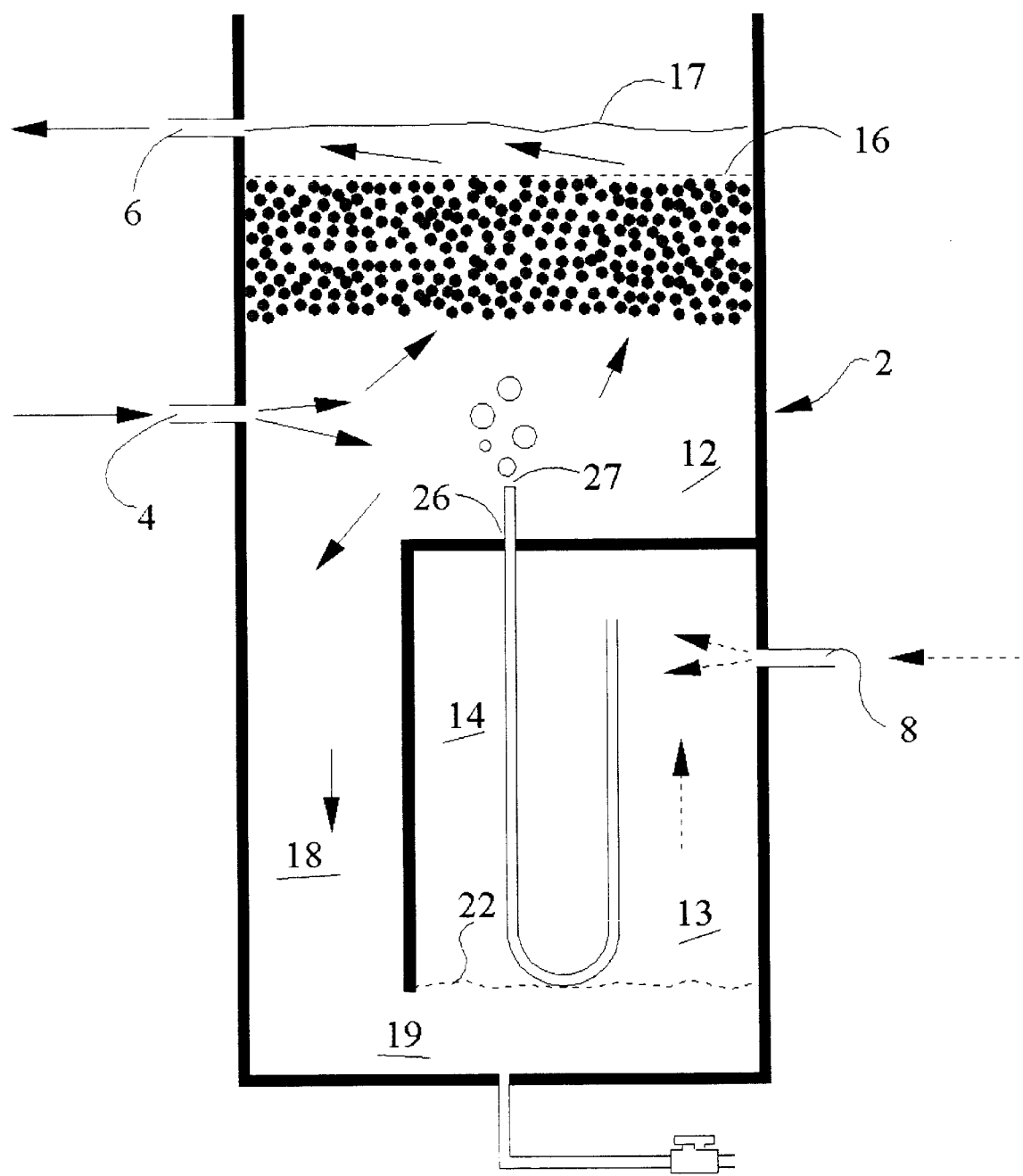
FIG. 4 illustrates the biofilter as the backwash stage begins and air moves from the charge chamber to the filter chamber.
Figure 5:
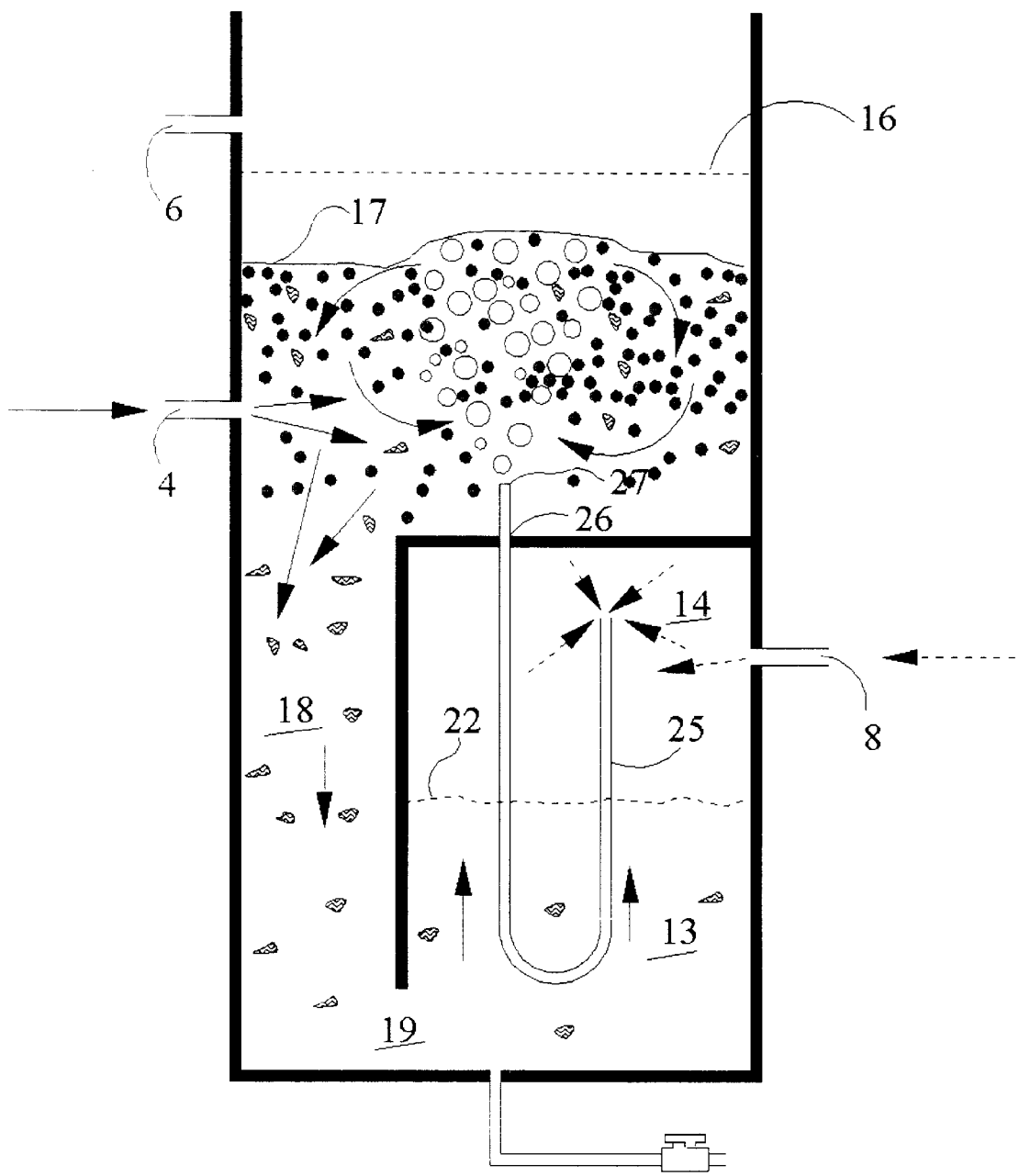
FIG. 5 illustrates the biofilter at an intermediate point in the backwash stage with water beginning to fill the charge chamber.

During the normal filtration mode, air is slowly entering air inlet 8 and accumulating in air pocket 14. Air pocket 14 gradually increases in size, displacing water from charge chamber 13 and lowering the water level 22 in charge chamber 13 as seen in FIG. 2. As air continues to accumulate in charge chamber 13, water level 22 will eventually reach the siphon bend 29 as seen in FIG. 3. At the point water level 22 moves below siphon bend 29, the pressure in charge chamber 13 will have exceeded the opposing pressure created by the column of water Y1 between the fluid surface 17 and siphon bend 29. As seen in FIGS. 4 and 5, air then begins to rapidly escape from charge chamber 13 through siphon 25 and air outlet 26. As air exits charge chamber 13, water from filter chamber 12 will flow into charge chamber 13 through passage 19. The rate air exits charge chamber 13 and is replaced by water is generally controlled by the cross sectional area of the passage through siphon 25 and air outlet 26. The cross sectional area of passage 19 may also be a controlling factor when passage 19 is comparatively small.

Figure 6:
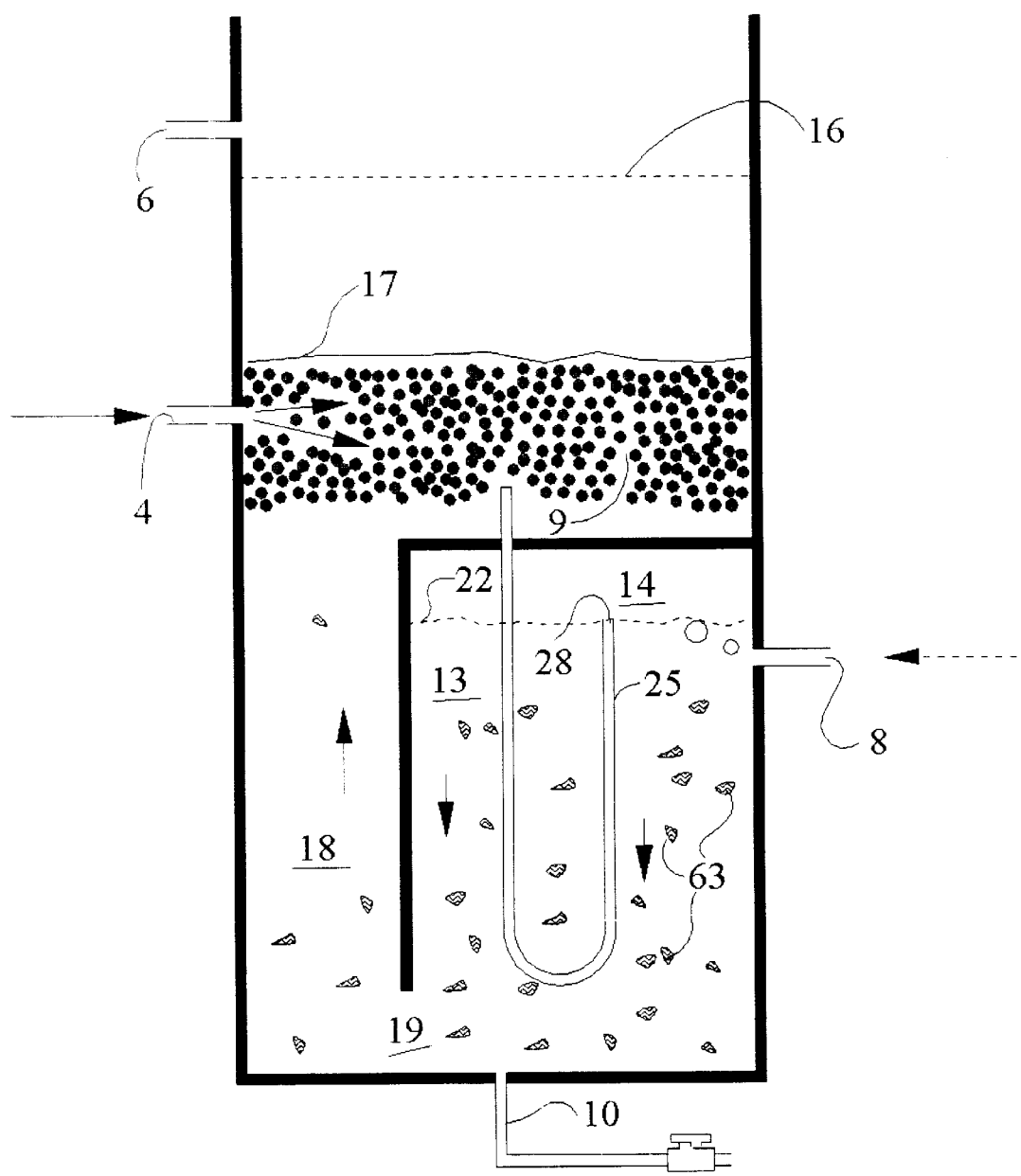
FIG. 6 illustrates the biofilter at the completion of the backwash stage with the filter chamber refilling with water prior to resuming the normal filtration stage.

The rapid displacement of air from charge chamber 13 to filter chamber 12 accomplishes at least two objectives. First, as shown in FIG. 5, the rapid flow of bubbles from inlet 26 through the media bed 9 will vigorously agitate the beads as media bed 9 is dropping toward the bottom of filter chamber 12 and thereby allowing excess floc and trapped sediments to be removed from filter media 15. Second, the exiting of air from charge chamber 13 allows water to enter the charge chamber 13 at a much higher rate than the rate at which water is entering tank 2 through water inlet 4. This allows the water in filter chamber 12 to flow into settling area 18 and charge chamber 13 and to lower or "drop" media bed 9 to a lower section of filter chamber 12 as seen in FIG. 6. When water level 22 on filter chamber 12 rises above the interior opening 28 of siphon 25, as seen in FIG. 6, air is no longer able to flow through siphon 25 and siphon 25 fills with water. Water level 22 continues to rise until the pressure in air pocket 14 is equal to the water pressure generated by the column of water between water surface 17 and water surface 22. As waste water continues to enter tank 2 through inlet 4, filter chamber 12 will fill and filter media 15 will float toward screen 16. When filter media 15 is restrained against screen 16, waste water will again flow through filter media 15 and exit tank 2 through outlet 6.

After water level 22 has reached its maximum level in charge chamber 13 during the backwashing cycle, water level 22 will drop at a comparatively slow rate as air enters charge chamber 13 through inlet 8. Thus charge chamber 13 is a relatively quiescent zone after water level 22 has reached its maximum level during the backwashing cycle. This allows charge chamber 13 to act as a primary clarifying area in which floc 63 removed from filter media 15 and transported to charge chamber 13 during backwashing, will be able to settle to the bottom of tank 2. The settling area 18 is also a quiescent zone which allows the settling of floc particles which did not reach charge chamber 13 during backwashing.

While either inlet 28 (see FIG. 6) or outlet 27 may be covered with screens to help prevent clogging, it is more typical to place screening only on inlet 28. Screens are particularly desirable when dealing with smaller diameter siphon tubes.

Those skilled in the art will recognize that the slow addition of air over time into the charge chamber 13 provides a far more efficient manner of powering the backwash operation than hereto known in the art. Because of the relatively slow flow of air required to operate the present invention, much less power may be used than required to operate conventional biofilters. For example, an air pump typically used in a small aquarium could be used to operate the present invention filtering a large koi pond or similar system. It is common practice to place a check valve and transparent container filled with water or other clear liquid in the air path so that air delivered to inlet 8 first bubbles through the water. This permits the filter user to verify air delivery and develop an approximate visual means of the relationship between the air delivery rate and the filter's operational behavior. This is particularly important for units operating at elevated water pressures where there is a tendency for the water pressure to compress the air and potentially overwhelm the air pump's peak pressure delivery capacity. Exceeding peak pressure delivery capacity will cause the check valve to close in order to prevent water back flow to pump. This and similar mechanisms are well known in the art and do not form a part of the present invention.

The present invention's manner of operation provides other benefits in addition to the minimal use of power. For example, as sludge accumulates in prior art biofilters, there is a tendency for the sludge to undergo anaerobic degradation from lack of oxygen and to produce undesirable compounds. When the present invention transfers wastewater from the filter chamber 12 to the charge chamber 13, the waste water passing over the sludge moderately disturbs and re-aerates the sludge; thereby controlling the redox level of the anaerobic reactions, and thus, limiting the production of noxious sulfide compounds. Additionally, the gradual rate at which water is moved from the charge chamber 13 to the filter chamber 12 benefits wastewater treatment. At the end of the backwash cycle when charge chamber 13 is filled with wastewater, the wastewater contains many entrained solids and other undesirable products, such as TAN compounds release from the sludge. The slow rate of water removal from charge chamber 13 allows the larger entrained solids to settle. The finer solids and TAN compounds will be introduced to filter chamber 12, but at a very gradual rate. This gradual introduction of fine solids and TAN compounds prevents the biological system from being overloaded or shocked by their re-introduction.

Figure 7:
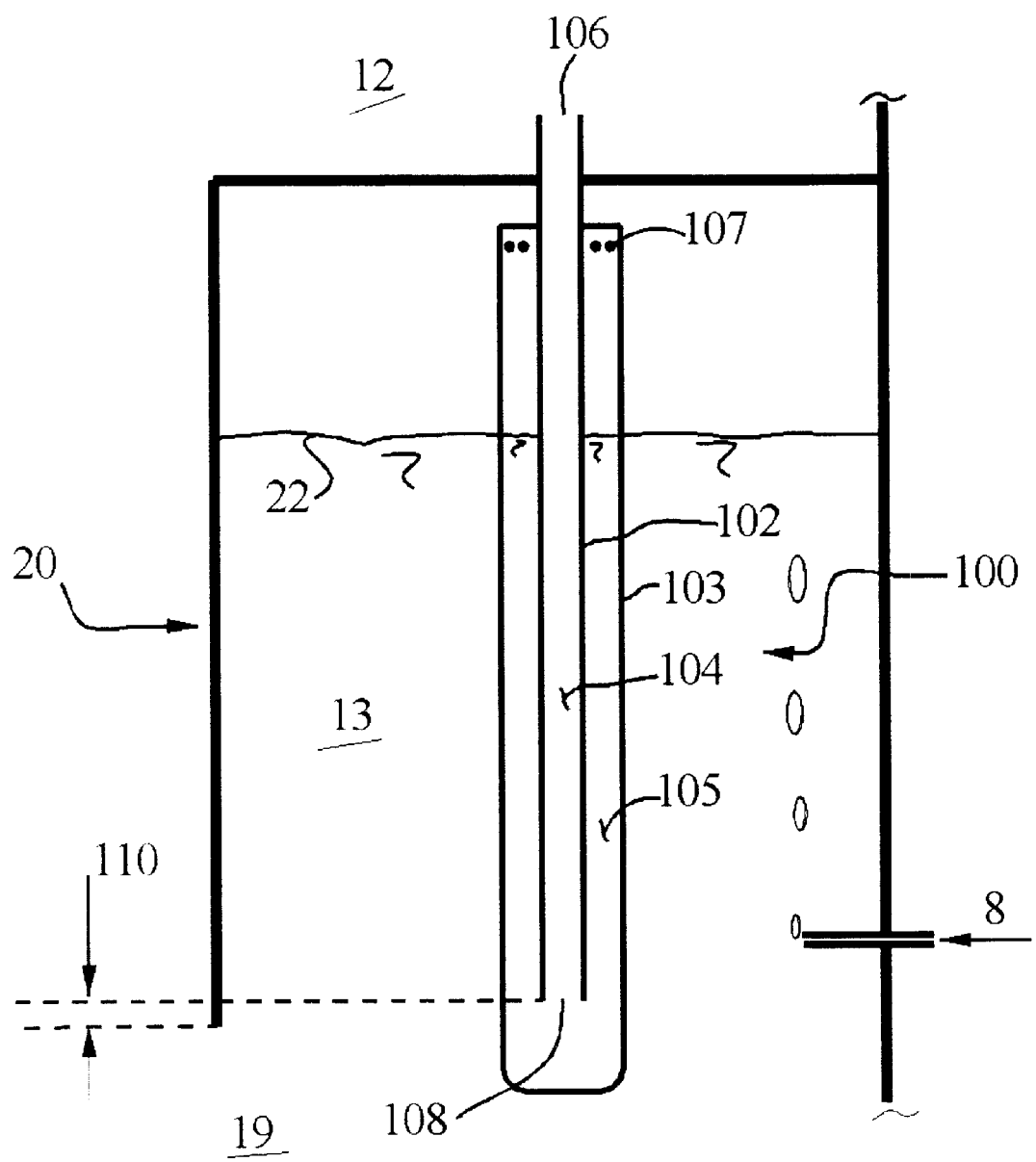
FIG. 7 illustrates another embodiment of the siphon trigger.

An alternate embodiment of the trigger is illustrated by the concentric siphon 100 seen in FIG. 7. As in previous embodiments, concentric siphon 100 is positioned within the charge chamber 13 defined by charge chamber wall 20. Also as before, there is an air inlet 8 and a later passage 19 into charge chamber 13. It will be understood that the FIG. 7 view of concentric siphon 100 is a cross-sectional view of two typically tubular concentric members. Concentric siphon 100 generally comprises an inner tubular body 102 and an outer tubular body 103. Formed within inner body 102 is a first or inner fluid passage 104. Likewise, formed between the outer wall of inner body 102 and the inner wall of outer body 103 is a second or outer passage 105. Inner passage 104 is fluidly connected through an opening at a first end 106 of inner body 102 to filter chamber 12 (seen in FIGS. 1–6) and fluidly connected to second passage 105 through an opening in second end 108. Outer body 103 substantially seals outer passage 105 from charge chamber 13 except for siphon inlets 107. Siphon inlets 107 allow for fluid (gas and liquid) communication from charge chamber 13, through outer passage 105, through inner passage 104, and into charge chamber 12. Typically inner body 102 is sized such that charge chamber 13 will discharge within 5–30 seconds. If the air is discharged too rapidly, the media bed seen in the previous figures tends to be broken into only a few large masses of beads. If the air is discharged too slowly, the agitation of the beads is not sufficiently vigorous for proper backwashing.

The operation of concentric siphon 100 is similar to that of the previously described siphon. At the end of a backwash cycle, the charge chamber will be filled with wastewater at least to the level of siphon inlets 107. Therefore, inner passage 104 and outer passage 105 are filled with water. As air enters charge chamber 13, the water level 22 is forced downward as seen in FIG. 7. Because air is able to enter through siphon inlets 107, the water level in outer passage 105 will be substantially equal to charge chamber water level 22. As the air pressure forces the water level in outer passage 105 downward, water is forced through inner passage 104 out into filter chamber 12. Eventually, the increasing air in charge chamber 13 will force water level 22 downward to a level approximated the opening in second end 108. As soon as the water level in outer passage 105 drops low enough for air to enter inner passage 104, the siphon will trigger. Inner passage 104 will fill with air bubbles, thereby displacing the water in inner passage 104. As previously described, a stream of bubbles will then rise to the filter media, vigorously agitating the media. As the air flows rapidly out of charge chamber 13, through concentric siphon 100, and into filter chamber 12, the water level 22 will again begin rising. When water level 22 reaches inlets 107, water will begin filling outer passage 105 and inner passage 104 and continue to do so until these passages are filled to approximately the level of inlets 107. Residual bubbles remaining in inner passage 104 float out through opening 106, thereby ending the backwash cycle.

The inner body 102 may be formed of any tubular material such as a length of PVC piping of a standard diameter. Outer body 103 may be formed of a larger standard diameter length of PVC tubing which is capped on both ends. An aperture in the upper cap of outer body 103 allows inner body 102 to extend therethrough and a seal is formed between the outer wall of inner body 102 and the aperture. Inlets 107 may then be formed in outer body 107 to effectively create concentric siphon 100. Those skilled in the fabrication arts will immediately realize the wide range of standard materials from which concentric siphon 100 may be constructed.

It has been found that concentric siphon 100 has several advantages over the previously described siphon. First, it has been found that avoiding excessive migration of beads into the charge chamber of screenless versions of the biofilter (described below in reference to FIG. 16) requires the siphon to actuate as the water level 22 approaches the bottom of wall 20. It is therefore desirable for the siphon to actuate in a relatively narrow space between the bottom of wall 20 and the end 108 of inner body 102. The narrow space or "trigger gap" is represented by distance 110 in FIG. 7. In one embodiment, trigger gap 100 is between $1/16$ and $1/4$ inches. It is believed that the straight edges at the bottom of inner body 102 will more reliably actuate at a given water level 22 than will a curved siphon such as seen in FIGS. 1–6.

Second, the straight passages of concentric siphon 100 are less susceptible to bio-fouling than curved siphon passages. There is the possibility that the centrifugal force of wastewater flowing through curved siphon passages will tend to deposit biological matter on the inner walls of the passage where the flowing water impacts most forcibly. Over time, such deposition of matter could lead to partial obstruction of the passage. The possibility of such adverse consequences is reduced by employing the straight passages of concentric siphon 100.

Figure 8:
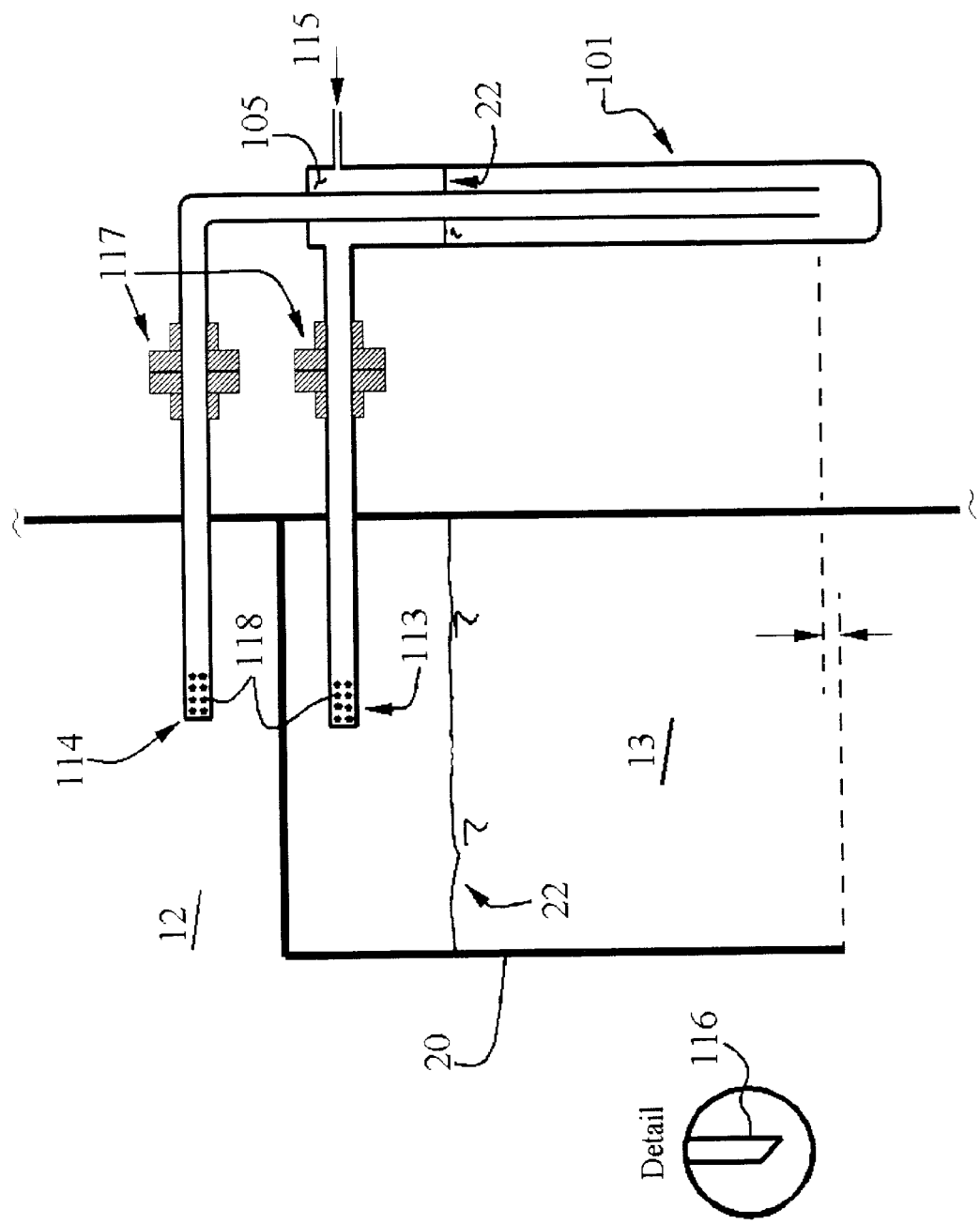
FIG. 8 illustrates modified version of the siphon trigger seen in FIG. 7.

FIG. 8 discloses an alternate embodiment of concentric siphon 100. In FIG. 8, concentric siphon 101 is positioned outside of charge chamber 13. Extended siphon outlet 114 extends into filter chamber 12 and extended siphon inlet 113 extends into charge chamber 13. The operation of the concentric siphon is similar to that described above. Concentric siphon 101 differs from siphon 100 in that air input 115 may be introduced into outer passage 105 of siphon 101 and enter charge chamber 13 through inlet 113. After siphon 101 activates, air flows from charge chamber 13, through inlet 113, through siphon 101 and into filter chamber 12 via outlet 114.

The inlets 113 and 114 are connected to inner and outer siphon passages 105 and 103 respectively by way of unions 117. Unions 117 are substantially air-tight joints which may be constructed in any conventional manner. Unions 117 allow easy access to siphon 101 should if ever be necessary to clean or otherwise obtain access to the interior of siphon 101. Additionally, inlets 113 and 114 may be constructed by forming apertures in any otherwise closed tubular member. This will tend to prevent the entrance of obstructions into siphon 101. While not shown, inlet and outlet 113 and 114 could also be open tubular ends which have been covered with screen or other suitable material. Such screening may also be advantageously positioned over the openings of siphon 100 seen in FIG. 7. This screening material will most typically have an opening size that is small enough to assure exclusion of the filtration media.

Although the trigger shown in the various figures is a siphon, the present invention can be operated with many variations of trigger devices, whether based on mechanical, electrical or other operating mechanisms. Any trigger device which will selectively allow air to be transferred from the charge chamber 13 to the filter chamber 12 may suffice. Several alternate triggers are disclosed in U.S. Pat. No. 5,770,080 to Malone which is incorporated by reference herein.

An alternate embodiment of the present invention is shown in FIG. 9. The floating media biofilter of FIG. 9 comprises a removable filtration module 125 positioned within a hull 135. Filtration module 125 generally includes a tubular body 127 inside of which is formed filter chamber 12 and charge chamber 13. Filtration module 125 will include a structure for supporting the module within hull 135. In the embodiment of FIG. 9, this supporting structure is formed from lip 132 resting on a shoulder 134 of hull 135. However, there are innumerable ways of removably supporting filtration module 125 within hull 135, all of which are intended to fall within the scope of the present invention.

While tubular body 127 is not limited to any particular material or shape, it is envisioned that common materials such a large diameter PVC piping would be well suited for forming tubular body 127. A first wall or side wall 128 will encircle filter chamber 12 and charge chamber 13. A dividing wall 129 will separate filter chamber 12 and charge chamber 13 with inner body 102 of siphon 100 extending through dividing wall 129. A screen 133 extends over the top of filter chamber 12 to retain the floating media during filtration. Siphon 100 is shown as being supported by dividing wall 129, but any manner of supporting siphon 100 is considered within the scope of the invention. Additionally, hull 135 includes an air inlet line 8, sludge retention area 136, and sludge removal line 141 similar to previously described embodiments.

An upper portion of side wall 128 will encircle the area of filter chamber 12 in which floating media bed 137 is formed when the floating media is in an nonfluidized or filtering state. In the embodiment of FIG. 9, openings 131 are formed in side wall 128 below media bed 137. While not shown explicitly in the view of FIG. 9, it will be understood that openings 131 may be series of slots formed around the circumference of body 127 (often referred to as "well screen"). Alternatively to slots, openings 131 could be formed by a series of small round holes or perforations sized to contain the media. For the commonly used ⅛ inch diameter beads, the openings 131 will typically be in the order of ¹⁄₂₀ to ¹⁄₁₀ of an inch and thereby form a screen-like inlet passage below the unfluidized media bed. Alternatively, large sections of side wall 128 could be replaced with screen material. The use of the term "screen" or "screening" herein is intended to encompass the above disclosed structures or similar porous structures. Flow arrows indicate how wastewater travels into hull 135, into a space interior to hull 135 and exterior to filter chamber 12, through openings 131, through media bed 137 and screen 133 to exit from effluent line 139. It can be seen that wastewater travels in a bottom to top path through media bed 137.

Hull 135 will include a head space 142 with a removable cap 142a and air outlets 140 formed in cap 142. Access to filter module 125 will be gained by removing cap 142a and lifting filter module 125 by a handle 145 attached to lip 132. Naturally, the structure for lifting filter module 125 need not be a handle as shown, but is intended to encompass any device for accomplishing the task of removing filter module 125. It is envisioned that it may be desirable to periodically remove filter module 125 from hull 135 and clean openings 131 and screen 133 with pressurized water or the like.

Figure 10:
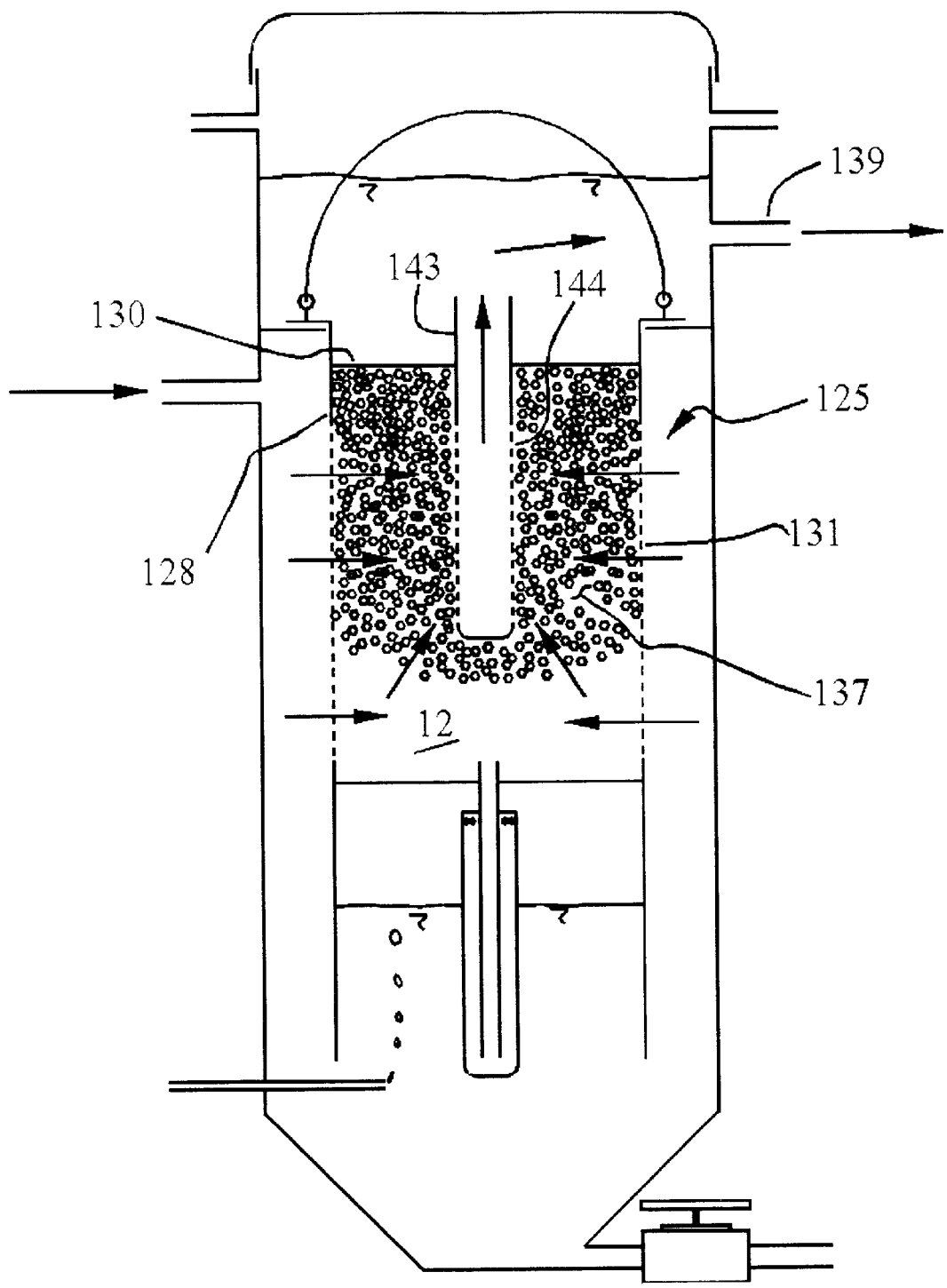
FIG. 10 illustrates a biofilter similar to FIG. 9, but utilizing a modified flow path.

FIG. 10 illustrates a modification of filter module 125. The openings 131 extend higher up along the side walls 128. Additionally, outlet conduit 143 having a series of openings 144 extends into the center of media bed 137. As with openings 131, openings 144 may be small slots positioned around the circumference of outlet conduit 143. Again observing the flow arrows, it can be seen how wastewater flows through openings 131, through media bed 137, into outlet conduit 143 through openings 144, and out through effluent outlet 139. One significant difference between the embodiments of FIGS. 9 and 10 is FIG. 10 has openings formed higher up side walls 128. This forms a side to center flow path through the media bed 137 as opposed to the bottom to top flow path seen in FIG. 9. A substantially watertight cover plate 130 is positioned above filter chamber 12. Cover plate 130 prevents water filtered through the media bed from taking any flow path other than through outlet tube 143.

Typically, the embodiment shown in FIG. 10 will result in a media bed which is longer along the vertical axis and narrower in diameter than the embodiment seen in FIG. 9. There are certain circumstances in which the side to center flow embodiment may be more preferable than the bottom to top flow configuration. First, this may be the case where space considerations of the biofilter's operating environment make a tall, slender biofilter more desirable than a shorter wider biofilter. Second, the side to center flow path through the floating media is typically shorter than the bottom to top flow path. This shorter flow path results in lower head losses and may be preferable where gravity flow (discussed below) is the driving force of the wastewater. Third, a longer, narrower in diameter media bed increases the surface area of the bed relative to the overall media volume. This increased surface area is desirable when "straining" or surface removal of larger particles is the primary removal method for the given biofilter application. Fourth, the greater surface area of the filtration bed corresponds to a larger area of entrance holes or screening. In applications where there is a potential for screens to eventually become clogged with filtered matter, the greater area of screening leads to longer filtration periods before the screen must be cleaned. Finally, the side to center flow path tends to compress the filter media away from the screened surface 131. This reduces the possibility that filter media will become stuck to the screen and remain so during backwashing.

Another consideration is the relative sizing of the charge chamber in relation to the filter chamber. In the embodiments of FIGS. 9–15, where the filter chamber is enclosed by a screen, the charge chamber 13 may be sized according to the equation:

$$V_3 \geq (e)V_1 + V_2 + Qi(t_{wash})$$

where:

$V_3$ is the charge chamber volume (see FIG. 2);

$V_1$ is the volume of the filter media bed;

e is the porosity of the filter media bed;

$V_2$ is the volume of the filter chamber not containing filter media;

Qi is the flow rate of the influent into the tank; and $t_{wash}$ is the time required for backwashing.

Generally it is preferred that $V_3$ range between $V_3=1.3[(e)V_1+V_2+Qi\ (t_{wash})]$ and $V_3=2[(e)V_1+V_2+Qi\ (t_{wash})]$. However, this range is not absolute and other variations of $V_3$ are intended to come within the scope of the present invention.

Figure 11:
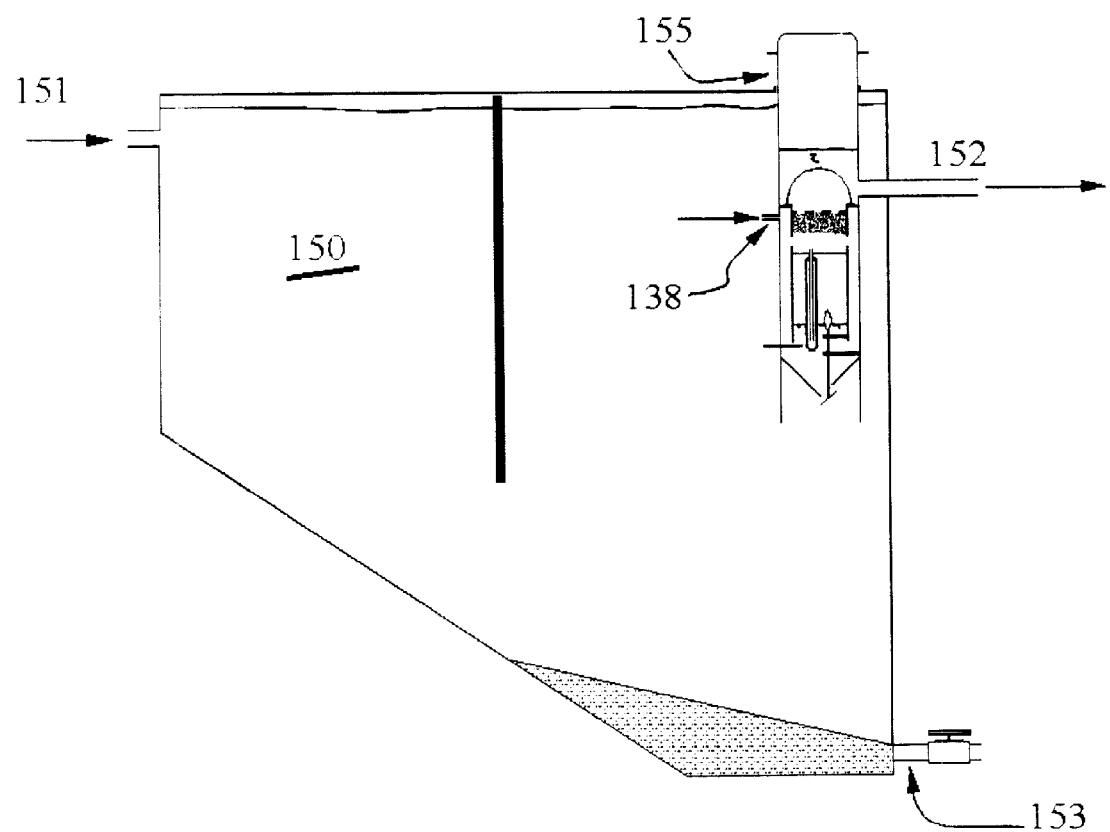
FIG. 11 illustrates waste water treatment system which incorporates a biofilter into a larger holding basin.
Figure 15:
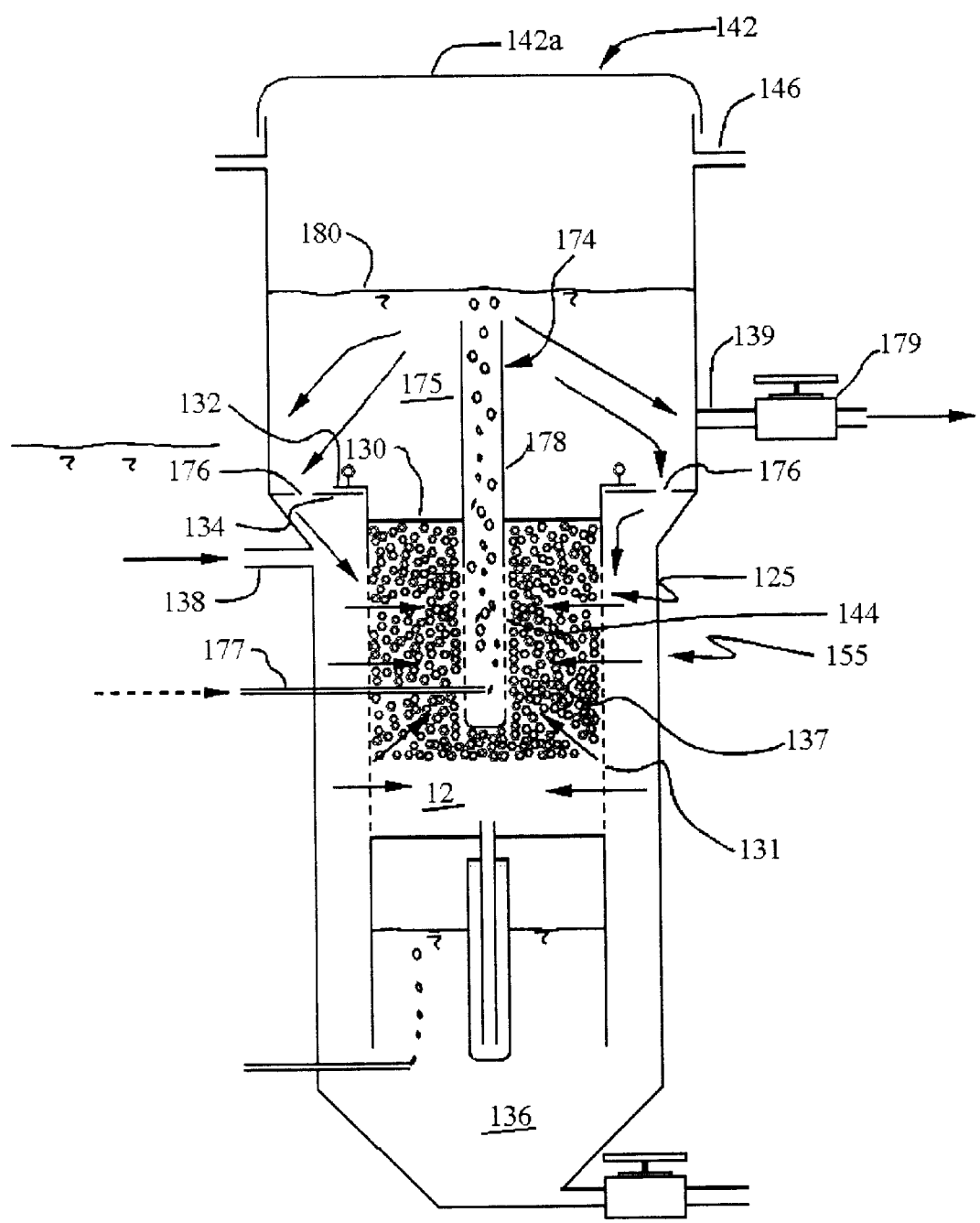
FIG. 15 illustrates a biofilter employing a recirculation mechanism.

FIGS. 11 and 12 illustrate how the present invention may be employed in a novel system for the treatment of wastewater wherein the system generally comprises a holding basin and a floating media biofilter. FIG. 11 discloses a wastewater holding basin 150 which will typically have a wastewater inlet 151 and a wastewater outlet 152. In its simplest form, holding basin 150 may simply comprise a tank for storing wastewater while the floating the media filter treats the wastewater. Those skilled in the art will recognize that wastewater is typically generated at certain peak periods during the day. During peak periods, the wastewater inflow may be greater than the treatment rate of the biofilter. The holding basin stores the wastewater in order that it may be treated by the biofilter during nonpeak flow periods. However, the definition of holding basin is not limited to tanks operating solely for wastewater storage purposes. It is envisioned that storage basin 150 may be a conventional septic tank or an aeration treatment unit. In such a case, storage basin 150 will typically include a sludge outlet 153. It is believed this application of the floating media biofilter is ideally suited for use in miniature or home septic tanks and aeration treatment units, although the invention is in no manner limited to such smaller holding basins.

Where holding basin 150 a septic tank, the biofilter comprises a secondary treatment stage. The septic tank provides a primary treatment stage through sedimentation and the anaerobic treatment of the wastewater. The floating media biofilter provides a secondary treatment through the filtration of solids not removed by sedimentation. Where holding basin 150 is an aeration treatment unit, the wastewater will undergo both sedimentation and aerobic biological treatment as part of the aeration unit's standard operation. The floating media biofilter then provides a tertiary treatment of the wastewater. This treatment is primarily of a filtration nature, but some further biological treatment will typically occur within the media bed. Additionally, a biofilter embodiment disclosed below in reference to FIG. 15 is specifically adapted to provide aeration and further biological treatment of the wastewater.

Figure 12B:
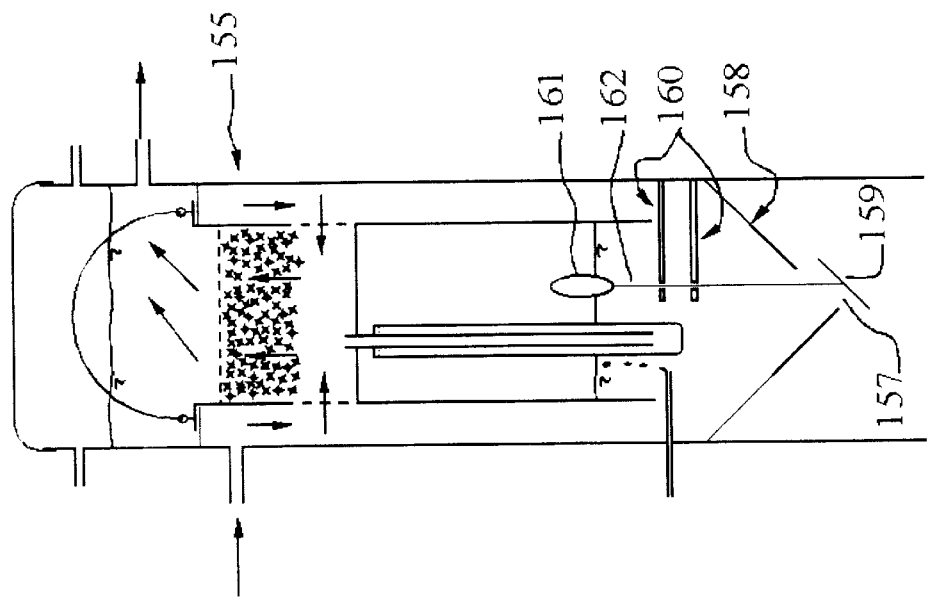
FIGS. 12a and 12b illustrates biofilters used in the treatment system of FIG. 11.
Figure 12A:
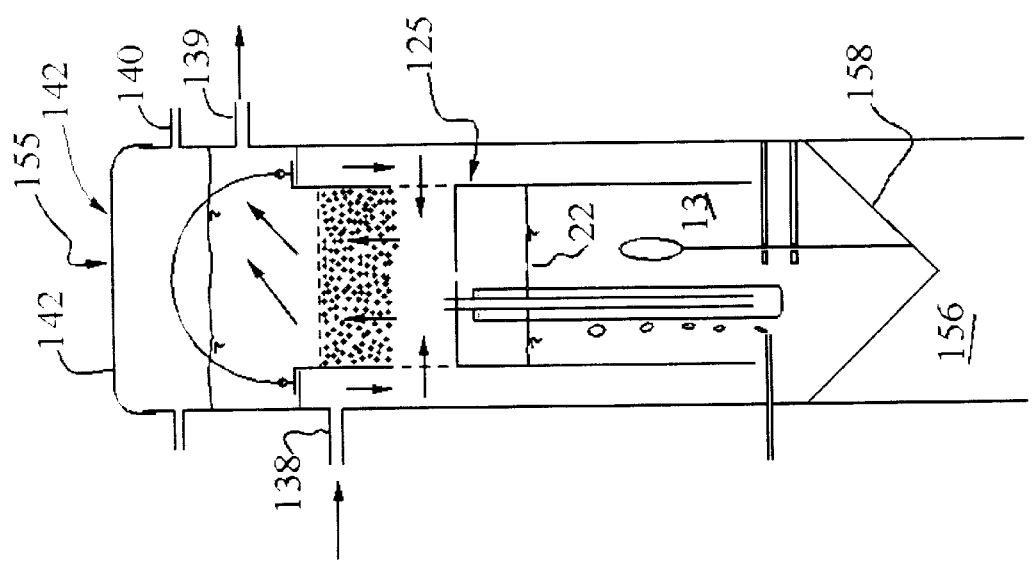

FIG. 11 illustrates a floating media unit which is positioned within a biofilter housing 155. FIGS. 12a and 12b more clearly show how this embodiment of the invention comprises a filtration module 125 positioned within biofilter housing 155. With the following described exceptions, FIG. 12 represent a removable biofilter module 125 substantially similar to that disclosed above in connection with FIG. 9. Biofilter housing 155 differs from hull 135 of FIG. 9 in that there is no sludge settling area 136. Rather, sludge is allowed to exit the bottom area 156 of biofilter housing 155 and enter into holding basin 150, where non-buoyant solids will eventually settle into the sludge settling area of holding basin 150. Biofilter housing 155 does provide sludge deflecting walls 158 which directs sludge to orifice or outlet 157. Sludge deflecting walls 158 in FIG. 12 are conical bottom sections and serve the dual purposes of directing sludge out of housing 155 and preventing the entry of floating solids from holding basin 150 into biofilter housing 155.

Deflecting walls 158, in conjunction with closing flap 159, serve another function in addition to directing sludge to outlet 157. It will also be understood that as water rapidly enters charge chamber 13, there would be a tendency for water outside of housing 155 to be drawn into charge chamber 13 if outlet 157 was permanently open. During the backwash cycle, water in the filter chamber becomes laden with solids agitated out of the media bed during fluidization of the bed. This water or "wash water" is the means for transporting out of the upper filter chamber the solids formerly trapped in the media bed. It is important to the efficient operation of the biofilter that the wash water be allowed to flow into charge chamber 13 and the lower section of housing 155. If water from outside housing 155 fills charge chamber 13, then wash water is inhibited from entering the lower section of housing 155.

To solve this potential problem, FIG. 12 also illustrate a selectively closing flap 159 which opens and closes sludge outlet 157. A float 161 is attached to flap 159 by way of a connecting member 162. Connecting member 162 extends through apertures in guide brackets 160. These apertures in guide brackets 160 are sufficiently large to allow connecting member 162 to move freely, but are small enough to prevent float 161 from passing therethrough. It can be seen from FIG. 12a that float 161 will maintain flap 159 in a closed position during much of the filtration stage of the biofilter's operation. As the water level 22 lowers in charge chamber 13, float 161 will lower sufficiently to open flap 159. Preferably, connecting member 162 is sized such that flap 159 will open shortly before a backwash cycle. This will allow sludge to exit housing 155 prior to backwashing. During backwashing, water rapidly enters charge chamber 13, raises float 161, and closes flap 159, thus preserving the space of charge chamber 13 for wash water. The side wall 158 seen in this embodiment would typically have an inclination greater than 45 degrees to assure sludge movement to the opening 157 since this movement will not be assisted by hydraulic forces associated with a sludge removal line 141 as seen in FIG. 9. It can be seen how the head of water above sludge settling area 136 tends to hydraulically assist in moving the sludge through line 141 of FIG. 9 when the line is opened.

In the embodiment of FIG. 13, the sludge outlet 157 is permanently open, but the invention provides another means of forcing wash water to the lower sections of housing 155 and preventing the inflow of water from outside housing 155. FIG. 13 illustrate that the filter chamber will be capped with a pressure cover 165. Pressure cover 165 is made with a substantially air impermeable material which covers the top portion of filter chamber 12. It will be understood that excepting induction aperture 167, pressure cover 165 forms a substantially air tight barrier between filter chamber 12 and the area under cap 142. The space between lip 132 and shoulder 134 may be made substantially air tight by any convention means. During the backwash cycle, air enters filter chamber 12 from charge chamber 13. However, unlike previous embodiments, the air entering filter chamber 12 does not immediately escape to the atmosphere. Rather, pressure cover 165 forces the buildup of an air pocket 170 as shown in FIG. 13b. While downflow induction aperture 167 allows some air to escape, the small diameter of induction aperture 167 slows the escape of air sufficiently to allow the formation of air pocket 170. Because air pocket 170 is forming in the upper portion of filter chamber 12, the wash water is pushed downward toward the bottom of biofilter housing 155. Thus, there is no possibility of any substantial amount of water from outside of housing 155 entering the housing during the backwash cycle. It can be seen in FIG. 13 that wastewater inlet 138 includes a downward extending section. This downward extending section must extend below the level of air pocket 170 in order to prevent the air in pocket 170 from escaping through inlet 138. It can be seen that it is irrelevant whether downflow induction aperture 167 is positioned directly on pressure plate 165 as seen in the top to bottom flow filter configuration of FIG. 13b or is positioned within outlet tube 143 as seen in FIG. 13a. Indeed, induction aperture 167 could be positioned anywhere which would allow formation of air pocket 170.

Additionally, there are numerous ways in which outlet 157 of housing 155 may be oriented. FIG. 13a shows a slanting sludge wall 168 which terminates with a side oriented outlet 157. It will be understood that wall 168 is a flat surface having a rounded shape to cover the circular bottom area of housing 155. FIG. 13b shows a conical sludge wall as in FIG. 12, but having a fix sludge deflector 163. Sludge deflector 163 is spaced away from the bottom of housing 155 to form a gap at outlet 157. It can be seen that sludge deflector 163 will prevent floating solids from rising up into housing 155 while allowing downwardly induced water to exit opening 157.

Figure 14B:
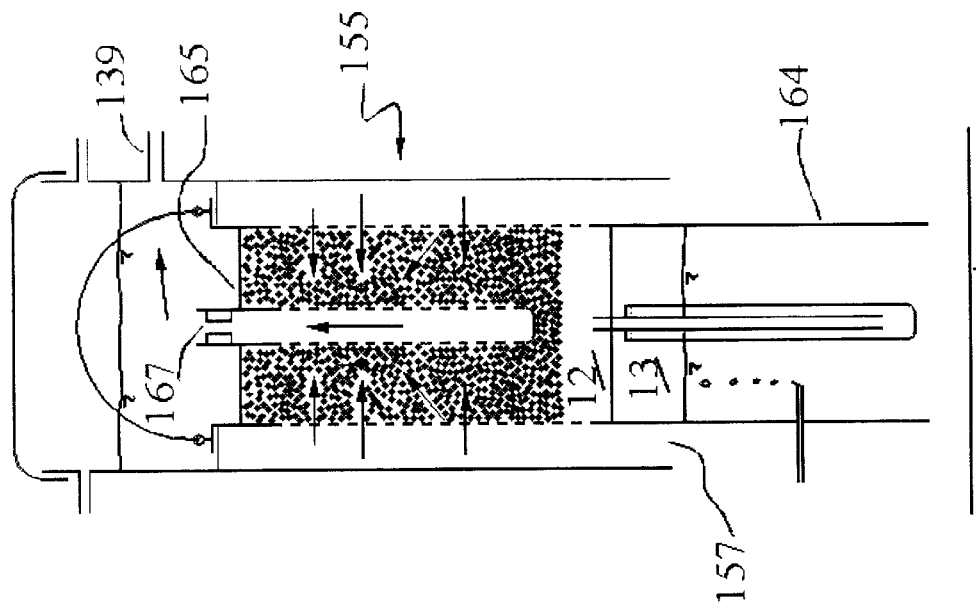
FIGS. 14a and 14b illustrate another alternate biofilter used in the treatment system of FIG. 11.
Figure 14A:
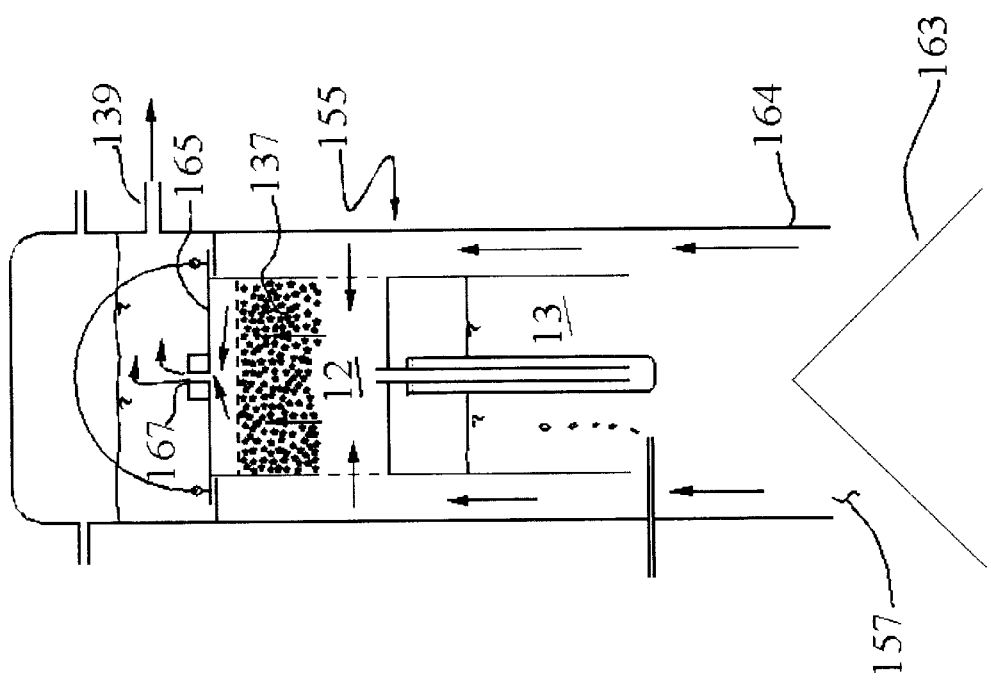

FIGS. 14a and 14b illustrate another embodiment of housing 155 which results in a somewhat different method of handling solids or sludge than described immediately above. It can been seen in FIG. 14 that the bottom section of housing 155 does not include a sloping conical sections 158 or walls 168 as disclosed in FIGS. 12 and 13. Nor does the filter housing 155 of FIG. 14 include wastewater inlet structures 138 in the proximity of the filter chamber as in the previous embodiments of housing 155. Rather, the FIG. 14a housing 155 combines both the wastewater inlet and the sludge outlet in the open space 157 formed between lower housing wall 164 and sludge deflector 163. Alternatively, the FIG. 14b housing shows open space 157 positioned adjacent to the upper section of charge chamber 13. In gravity flow situations, the treated water or effluent outlet will be positioned below the upper level of wastewater in holding basin 150 (see FIG. 11). Therefore, the pressure differential will induce flow through open space 157 and then through filter media bed 137. During the backwash cycle, pressure cover 165 and downflow induction aperture 167 will force wash water out of filter chamber 12 and out of open space 157 as described in connection with FIG. 13. It can be seen in FIG. 14 that open space 157 is larger than previous embodiments. This is particularly true in view of opening 157 being open around the entire lower circumference of housing 155. This larger opening 157 is desirable where the biofilter is expected to discharge large quantities of sludge materials from the filter bed. The larger opening 157 will be less susceptible to the possibility of clogging from heavy deposits of sludge. Additionally, this configuration avoids the possibility that sludge will accumulate on the internal inclined surface illustrated as 168 and 158 in FIG. 13.

Because biofilter housing 155 will typically be positioned within a larger holding basin, there is very little restriction on how large charge chamber 13 may be made by simply extending lower housing wall 164 downward. The advantage of a larger charge chamber 13 is that it will provide more air for a longer and more vigorous agitation of the filter media during backwashing. This is an especially important consideration when the wastewater being treated will carry a large load of solids into the filter media. In such cases, it may be desirable to have the volume of charge chamber 13 be two to four times larger than the volume of the media bed.

A still further embodiment of the present invention is shown in FIG. 15. FIG. 15 illustrates how a recirculation method may be incorporated into the biofilter's operation. Biofilter housing 155 includes a removable filter module 125, sludge settling area 136, head space 142 and other features as described in conjunction with FIGS. 9 and 10. However, FIG. 15 further illustrates an air lift pump 174 extending into filter bed 137 and recirculation ports 176 positioned adjacent to housing shoulders 134. Additionally, head space 142 is formed with sufficient height to create a recirculation area 175 above filter chamber 12.

One embodiment of airlift pump 174 may include tubular member 178 having a series of apertures 144 formed therein and a rapid air input 177 communicating with a lower section of tubular member 178. Again, apertures 144 may be in the form of well screen as previously described. The flow of air from rapid air input 177 evacuates fluid from tubular member 178 upwards into recirculation area 175. As is typical for airlift pumps, the air flow rate of air input 177 should be approximately one to five cubic feet of air for every cubic foot of water to be moved. This evacuation of fluid from tubular member 178 induces a flow of fluid from outside of filter chamber 12, through media bed 137 into tubular member 178, where the fluid is then moved into recirculation area 175. Effluent outlet 139 has an outflow restriction insuring that the flow of fluid exiting outlet 139 is less than the flow moved into recirculation area 175 by airlift pump 174. In the illustrated embodiment, the restriction is formed by valve 179, but could be formed by decreasing the outlet line diameter or by any other conventional means. The flow of fluid into recirculation area 175 creates a fluid level 180 within head space 142. It will be readily apparent that the recirculation ports 176 provide a route through which fluid exiting airlift 174 may return to media bed 137 and make multiple passes therethrough. It will be understood that top plate 130 and the joint between shoulder 134 and lip 132 should be substantially water tight in order to direct substantially all of the recirculation through ports 176. While the illustrated embodiment shows water movement induced by an air pump, it will be understood that water movement may be accomplished by other conventional devices such as a pump with a venturi aerator.

The purpose of recirculation is primarily to provide improved biological treatment of the wastewater. The recirculation through filter media provides greater contact time between the water being treated and the biological organisms adhering to the filter media. Additionally, the movement of water with air lift pump 174 insures the water is sufficiently oxygenated for proper biological treatment. It is believed that this recirculation technique will significantly reduce the biochemical oxygen demand (BOD) of wastewater exiting the biofilter. For example, wastewater entering the biofilter with a BOD of 30 mg/l can be expected to have approximately 15 mg/l BOD removal through the filtration of particulates. However, the remaining 15 mg/l is soluble BOD and must be removed through biological treatment. It is expected that the recirculation and biological treatment described above will result in further BOD reduction to approximately 3–5 mg/l BOD in the effluent. Repeated passes through the biofilter using this technique is also expected to improve the biofilter's ability to capture fine suspended solids (e.g. solids having a diameter less than 50 um), thereby lowering both total suspended solids and turbidity levels of water exiting the filter.

It will be apparent that the rate of recirculation may be controlled by both the area of the recirculation ports 176 and the head at ports 176 generated by the height of fluid level 180 within recirculation area 175. Fluid level 180 may in turn be controlled by the rate of flow through air pump 174 and the flow rate exiting the biofilter through outlet 139. The ratio of recirculated fluid to fluid leaving the system from outlet 139 will typically (but not always) be at least one and may be represented by the equation:

$$q_r = \frac{K_f(BOD_i - BOD_e)Q}{\Delta C}$$

where $q_r$ is the recirculated flow, Q the treated water exiting the system, $BOD_i$ is the BOD of the influent flow, $BOD_e$ is the BOD of the effluent flow, $K_f$ is a correction factor that corrects for the degree of BOD expression within media bed 137, and $\Delta C$ is the single pass drop in dissolved oxygen concentration. $K_f$ can be expected to vary with the soluble and particulate BOD ratio, the chemical nature of the wastewater, the backwash vigor, backwash frequency, the type of media in the bed, and the temperature of the wastewater. $K_f$ will typically be determined empirically for the conditions of a particular application. For domestic wastewaters processed by a biofilter subject to frequent backwashing (such as a 1 to 2 hour interval), $K_f$ is expected to range between 0.5 and 2.0. $\Delta C$ will be controlled by factors such as the aeration efficiency of the airlift pump 174, the wastewater strength or biological loading, and the level of biological activity in the media bed. For secondary domestic wastewater treatment application with a $BOD_i$ of 40–100 mg/l and a target $BOD_e$ of 10–30 mg/l, $\Delta C$ can be expected to range between 0.5 and 4.0 mg/l.

The number of passes through the biofilter may be reduced by utilizing pure oxygen or an oxygen rich gas to drive airlift pump 174. Alternatively, the use of air diffusers with improved gas transfer characteristics at the outlet of rapid air source 177 may also reduce the number of required passes.

Those skilled in the art will appreciate the advantages of using the present invention in conjunction with a comparatively unsophisticated treatment method such as a septic tank. Septic tanks are typically expected to obtain a BOD reduction to approximately 30 mg/l. Increasingly strict environmental regulations have dictated that such levels are not acceptable and have required use of more effective (and much more costly) aeration treatment units. However, by combining the present invention with a conventional septic tank as suggested in FIG. 11, a treatment system is created which matches or exceeds the treatment provide by more expensive aeration units. Moreover, the present invention can be used as an additional, final treatment stage in conjunction with conventional aeration treatment systems to provide enhanced treatment or "polishing" of effluent waters. Floating media biofilters are faster and more effective at removing fine (less than 50 um) suspended solids than the sedimentation procedures used in conventional treatment units. Since conventional sedimentation requires long residence times to remove fine solids, the alternative use of a biofilter to remove fine solids shortens the hydraulic residence time of the conventional aeration treatment system. Reduction of the hydraulic residence time will result in a proportional reduction in the size and construction cost of the treatment system. In addition to the BOD reduction realized through larger particulate removal, the biofilter can provide targeted polishing of soluble BOD and fine particulates in effluent waters through biological activity. A disadvantage found in many conventional treatment systems is that sludge stabilization is taking place in the same treatment area as is the attempted reduction of soluble BOD. The degenerating sludge actually produces additional BOD which competes for the oxygen needed to reduce the existing soluble BOD. Because the biofilter shown herein is partially isolated from the larger basin by housing 155 and because the biofilter transfers the sludge stabilization function to the larger basin, the biofilter may be tuned to optimize soluble BOD reduction and allow the effluent stream to be more efficiently polished.

Figure 16:
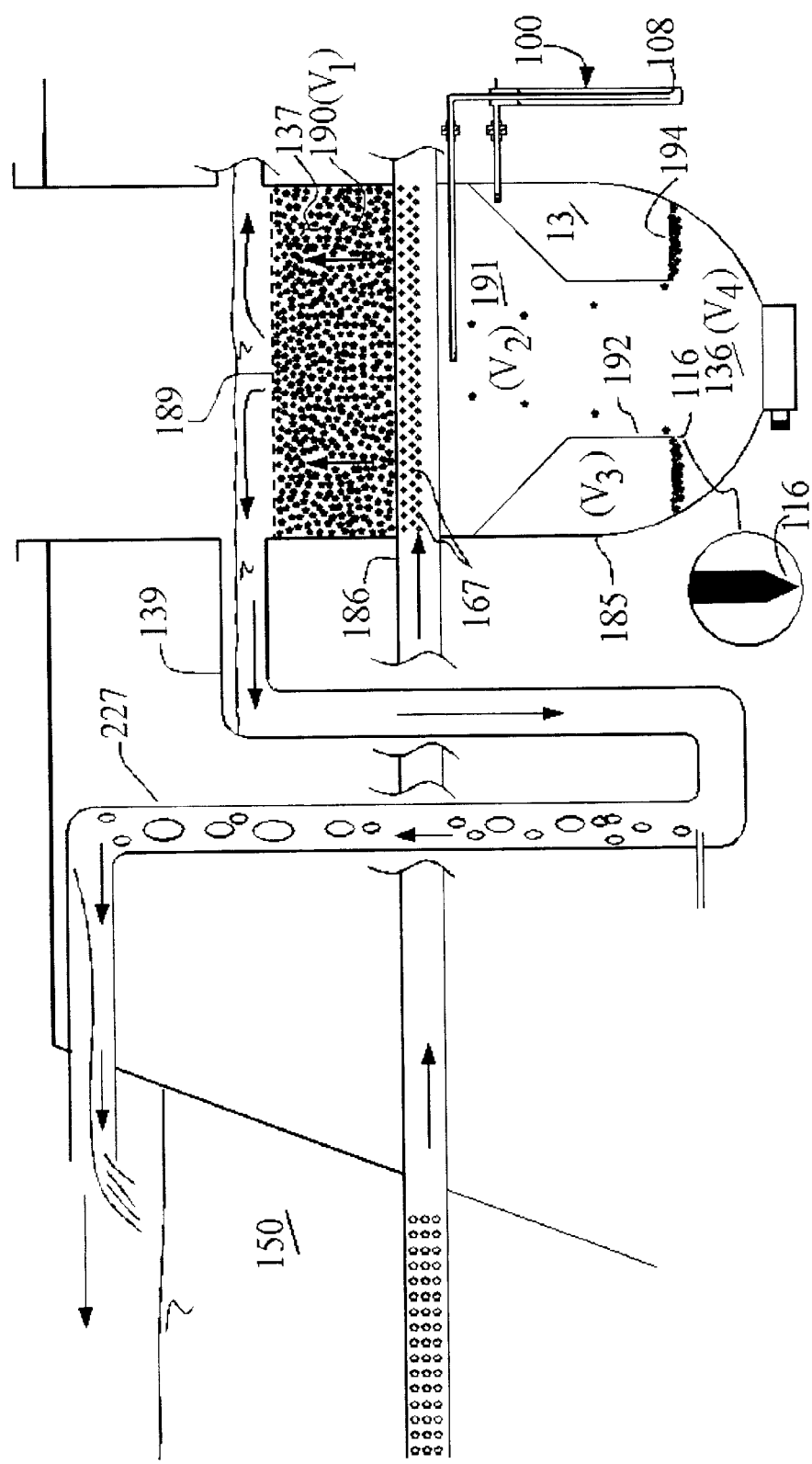
FIG. 16 illustrates a screenless version of the biofilter.
Figure 18B:
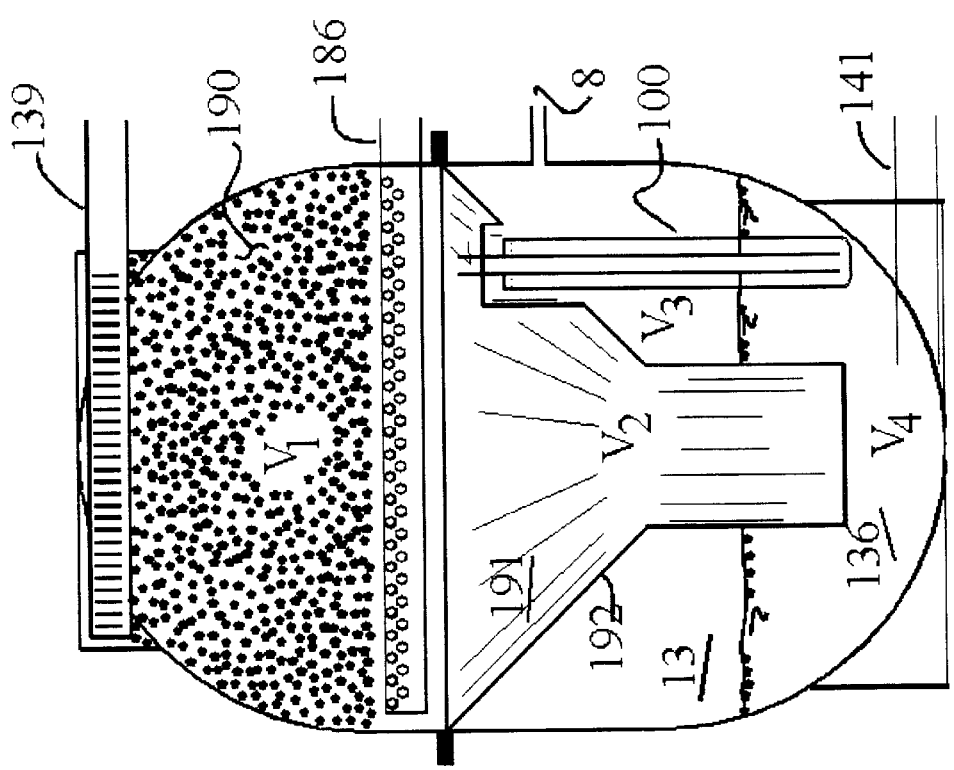
FIGS. 18a and 18b illustrate an alternate embodiment of the screenless biofilter.

FIG. 16 illustrates a further embodiment of the present invention which includes a wastewater diffuser and lacks any type of screen to limit the downward movement of filter media during the backwash cycle. It will be understood that FIG. 16 is a sectional view of a biofilter having a concentric hull or outer wall 185. In other words, the three dimensional view of the biofilter may be visualized by rotating the shown cross-section around its vertical centerline. It can also be seen that the biofilter is positioned below a storage basin 150 to induce gravity flow, that air lift pump 227 recirculates treated water to storage basin 150, and influent diffuser 186 is fed from storage basin 150. For purposes of explanation, the filter chamber may be divided into an upper section 190 and a lower section 191. Lower section 191 is bounded on its lower portion by a concentric internal guide wall 192. FIG. 18b more clearly illustrates how internal guide wall 192 forms a funnel shaped member within the biofilter. Again viewing FIG. 16, it can be seen that charge chamber 13 is concentrically positioned around guide wall 192 or between guide wall 192 and outer wall 185. An externally positioned concentric siphon 101 communicates with the lower portion 191 of the filter chamber and with charge chamber 13 as previously described in relation to FIG. 8. Wastewater enters through inlet diffuser 186 and is dispersed into upper filter chamber 190. The wastewater travels through media bed 137, through screen 189 which retains the media in upper filter chamber 190, and exits through one or more outlets 139.

Figure 17:
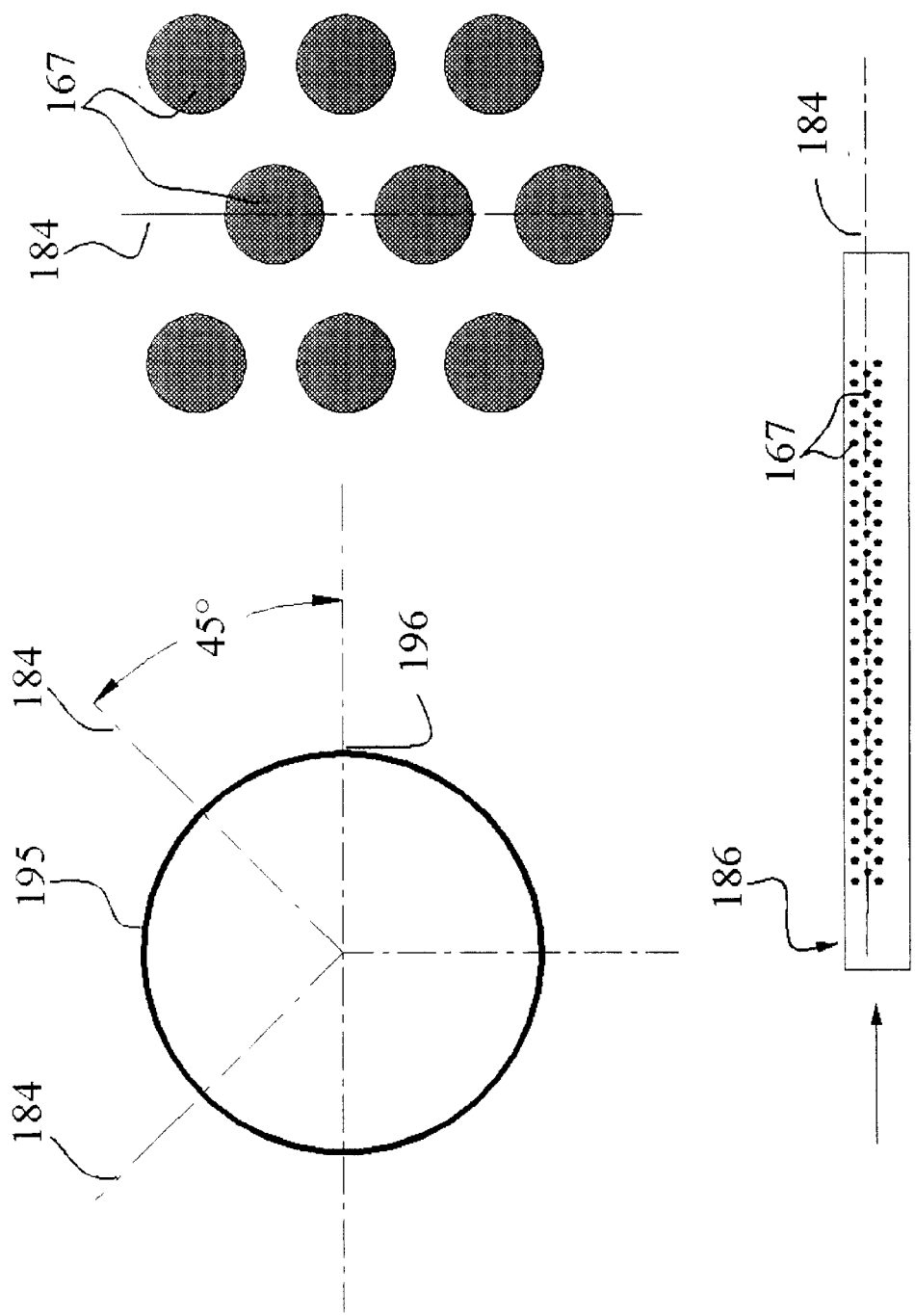
FIG. 17 illustrates details of a waste water inlet structure.

It will be understood that inlet diffuser 186 is an elongated pipe-like member which extents through the middle portion (i.e. along its diameter) of the biofilter at a point below upper filter chamber 190. Moreover, while only a single diffuser 186 is shown in the figures, it may in some applications be desirable to have multiple diffusers 186. It is desirable to insure bubbles are not entrained with the wastewater influent entering the biofilter. In larger applications, a conventional means of eliminating bubbles is employed, such as a commercially available bubble separation unit. FIG. 17 more clearly illustrates how inlet diffuser 186 has a series of apertures 167 positioned along its length. In the embodiment shown, apertures 167 are offset from the top 195 of diffuser 186. Apertures 167 have a centerline 184 at approximately 45 degrees from top 195 and comprise a length of apertures down centerline 184 and a length of apertures on each side of centerline 184. In the embodiment shown, apertures 167 are one inch in diameter, but naturally could be of different diameters as individual situations dictate. It is undesirable that the apertures be at the top of diffuser 186 since this would direct the wastewater inlet flow perpendicularly into the bottom of media bed 137. If flowing wastewater is directed straight upward toward the bottom of media bed 137 with too much force, the flow may tend to separate media bed 137 or cut a path through the media rather than flowing through the bed in a gentle, uniformly dispersed manner. It is also undesirable for the apertures to be below the horizontal position 196. After backwashing, the wash water containing solids removed from media bed 137 will be positioned in lower filter chamber 191. It is desirable to have lower filter chamber 191 remain quiescent as possible in order to allow solids in the wash water to settle toward the sludge area of the biofilter. Inlet wastewaters directed below the horizontal position 196 would induce currents in lower filter chamber 191 and tend to disrupt the settling of these solids.

The effective diameter of the holes (or width of the slots) in the inlet diffuser 186 are generally selected to avoid clogging of the diffuser. In screenless models, these openings are generally large with respect to the media since continuous positive flow out of the diffuser typically prevents entry of the media into the diffuser openings. Larger diffuser openings facilitate the passage of oversized solids into the biofilter and ultimately to the sludge storage area of the biofilter. Effective diameters between ¼ and 1 inch are normally used to treat aquaculture and ornamental pond waters. The number of openings 167 is calculated to provide limited velocity to the water exiting the openings. The limited velocity prevents scouring of media bed 137 and/or turbulent mixing with wash water in lower filter chamber 191. A typical velocity would be between 0.25 and 1.0 feet per second.

It will be understood that certain of the previous embodiments position screens such that incoming wastewater must flow through the screens to enter the filter media. For example, the screens or apertures 131 seen in FIG. 9. Such screens may have a significant disadvantage over the embodiment of FIG. 16, which has no such screen. Screens facing incoming wastewater are the component of the biofilter most likely to become clogged and require manual removal and cleaning. By eliminating this screen from the design, it may be possible for the biofilter to operate for far longer periods without any type of manual cleaning or servicing. It is noted that the same clogging problem does not exist with the upper screen 189 seen in FIG. 16. The water which flows through screen 189 has been filtered through media bed 137 and therefore the water does not carry the particles which tend to obstruct a screen positioned below the filter media. Where the term "screenless" or "screenless filter" is used, it will be understood that this connotes the absence of a screen within the lower filter chamber 191 that effectively partitions the biofilter such that filter media from media bed 137 cannot pass through chamber 191 into charge chamber 13. Although this screen is known to be useful in the separation of wash water from the floating media during backwashing, in many applications partial clogging of this screen is known to reduce the rate of air discharge from charge chamber 13 and/or to interfere with the operation of siphon-type triggers. Therefore, screenless configurations are preferred in the presence of large or filamentous waste materials. Waste materials are considered large where their diameters are approximate the size of the filter media or larger. These large waste materials tend to cause unacceptable obstruction of screens and typically are found in domestic wastewater and outdoor bodies of water.

While desirable in many applications, the lack of a lower screen confining media bed 137 to a definite space within the biofilter does create additional complexities. It is necessary to closely control the movement of the expanded filter media and wash water in lower filter chamber 191 during the backwash cycle or an excessive number of beads will enter charge chamber 13. It can be seen in FIG. 16 that the funnel shaped wall 192 will provide an expanded area for the washing and agitating of media beads while also narrowing the area into which beads can move as wall 192 extends toward the lower portion of the biofilter. This is one factor tending to reduce the number of beads entering charge chamber 13. Another factor which will reduce the beads migrating into filter chamber 13 is the sizing of the volume of various regions of the biofilter, i.e. upper filter chamber 190, lower filter chamber 191, charge chamber 13, and sludge holding area 136. The volume of these regions area reflected in FIG. 16 by the symbols V1, V2, V3, and V4 respectively. One possible method of sizing these regions of the biofilter is simply to construct the biofilter such that V1=V2=V3=V4. However, it is preferred in screenless filters that V2 be greater than V1 to help reduce the migration of beads into filter chamber 13. In such a case, V3 may be equal to V1 and V4 sized somewhat smaller than V1. It is estimated that the ratio of V2 to V1 should range between 1.2 and 1.5. How much smaller V4 is compared to V1 may vary greatly depending on the volume of sludge desired to be held in sludge area 136 between sludge removal operations. For example, in some marine aquaculture applications, an extended sludge retention time encourages denitrification. It is estimated that the ratio of V4 to V1 should range between 0.2 and 0.5 when it is envisioned that frequent sludge removal will be carried out.

Despite the above efforts to prevent the entry of beads into charge chamber 13 of screenless biofilters, it is expected some beads will inevitably migrate into charge chamber 13. Therefore, it is advantageous to have some method of returning the beads from charge chamber 13 to filter chamber 12. This may be accomplished if the siphon 100 is positioned such that it will trigger very close to bottom 116 of wall 192 as seen in FIG. 16. FIG. 16 illustrates a group of media beads 194 floating in charge chamber 13. As a substantial number of beads accumulate such that two or three layers of beads exist, the weight of the upper beads will push the lower beads below the fluid surface. If the water level is very near the bottom edge 116 of wall 192, the beads pushed below the fluid surface will tend to move under bottom edge 116 into lower filter chamber 191 and float back into mead bed 137 prior to the approaching backwash cycle. In fact, it has been observed that the water level in charge chamber 13 can actually be made to extend slightly below the lower edge 116 due to surface tension of the water. From this description, it can be understood why the distance described in reference to FIG. 7 between discharge point of the siphon (end 108 of inner body 102) and the bottom of wall 20, the trigger gap 110, is very important. As mentioned above, it is believed that air siphoning trigger gap 110 should be between $1/16$ and $1/4$ of an inch for the bead return mechanism to operate properly. However, those skilled in the art will recognize that water surface tension forces may influence the exact height at which the siphon triggers.

Returning to FIG. 16, a detailed section of the bottom 116 of wall 192 illustrates how wall bottom 116 may be constructed with a sharp edge. The purpose of this sharp edge is to help induce beads to return charge chamber 13. As the submerged beads described above approach the edge of wall bottom 116, these beads will tend to move down the sharp edge and have the maximum opportunity to roll free of the edge of wall bottom 116 and return to filter chamber 12. Thus, the sharp edge will further assist in carrying out the bead return mechanism.

The material used to construct the biofilter housing or "hull" may vary for different designs. For most designs, some type of plastic molding such as vacuum forming, roto-molding, blow molding, or injection molding will be most suitable for large scale production. Fiberglass hulls are most suitable for special order designs where only one or a few biofilters are to be produced or the size of the biofilter prevents a plastic molding technique. Steel may be used to design a biofilter hull where exceedingly high internal pressures are required.

Figure 18A:
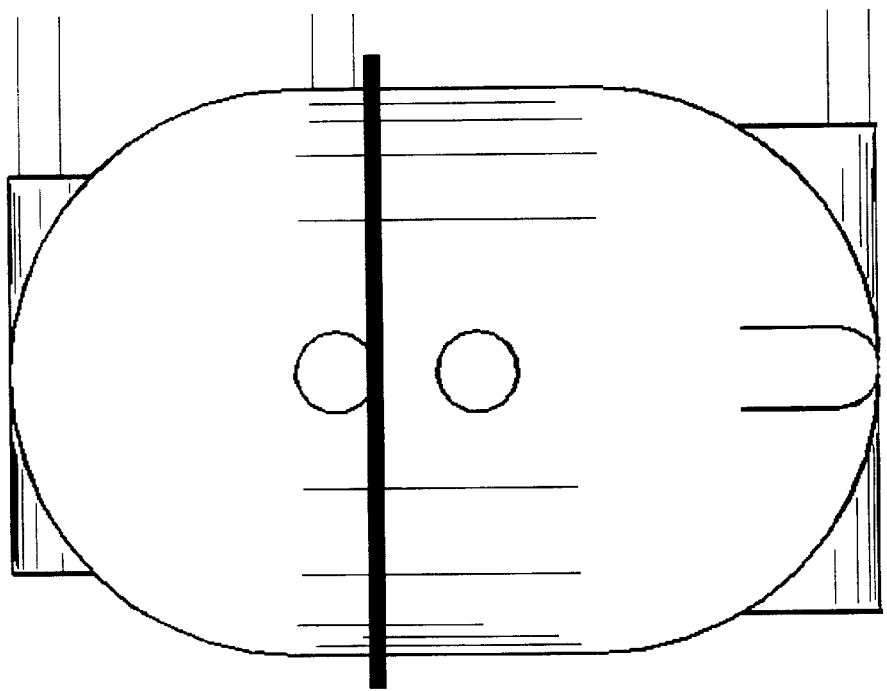

When using a plastic molding technique, it is most cost effective to have the biofilter hull produced from as few pieces as possible. FIG. 18 illustrates one type of hull design which requires only two molding steps. In the first step, two mirror image shapes or shells will be molded to form the upper filter chamber 190 and the lower section of the biofilter (which will include charge 13, lower filter chamber 191 and sludge area 136). The second molding step will produce the funnel shaped lower filter chamber wall 192. The biofilter will be constructed by connecting a concentric siphon 100 through wall 192 and positioning this funnel shaped structure between the upper and lower shells. Thereafter, plastic apertures (typically standard female couplings) may be "spun in" (i.e. frictional forces generating a bond between the two plastic components) to accommodate the insertion of tubular (threaded male) members which constitute treated water outlet 139, wastewater inlet 186, air inlet 8, and sludge removal outlet 141.

Figure 19:
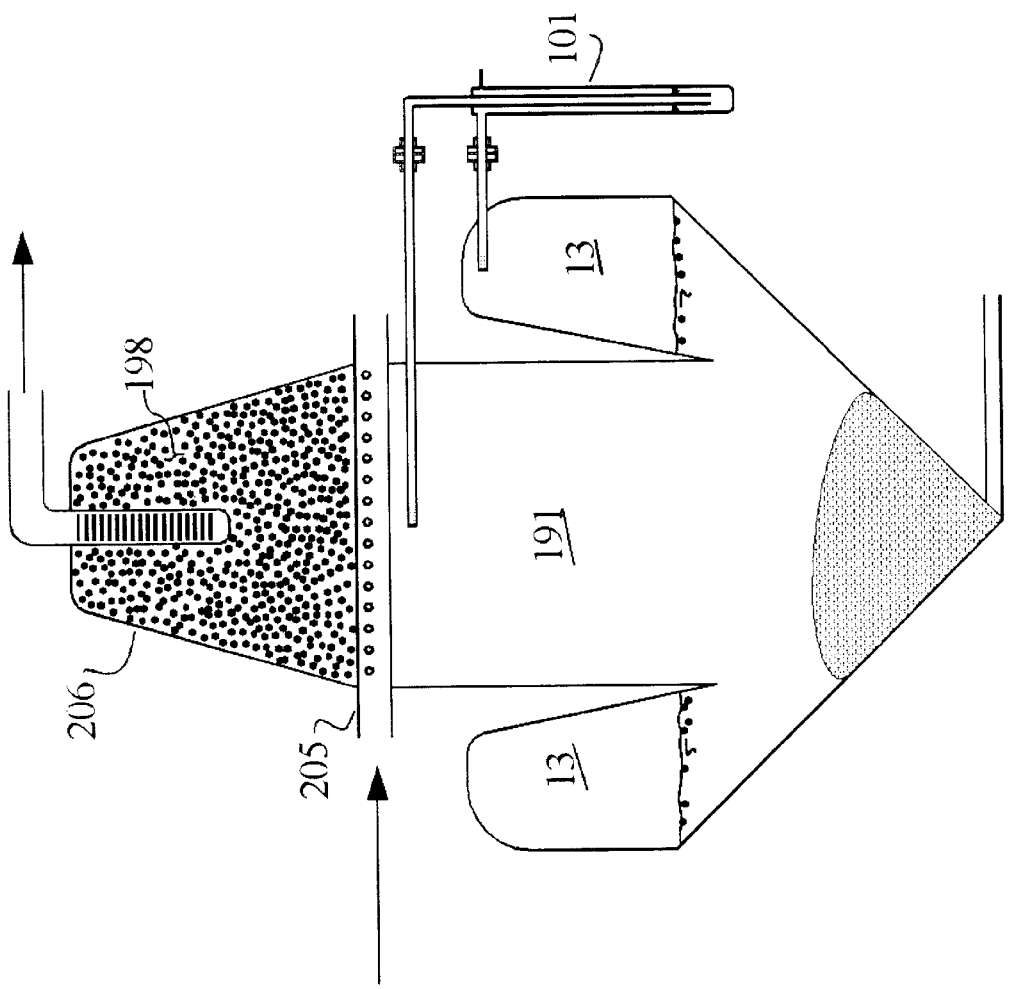
FIG. 19 illustrates a biofilter having a concentric charge chamber.
Figure 20B:
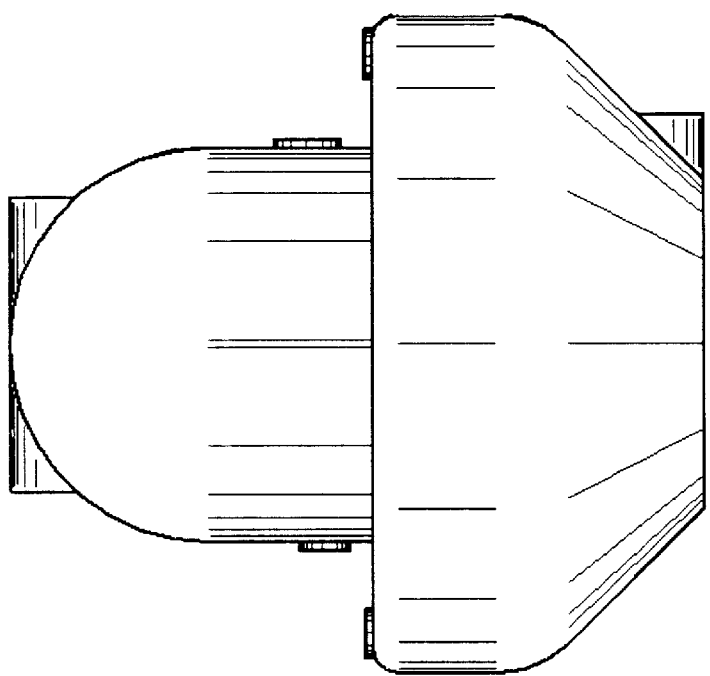
FIGS. 20a and 20b illustrate another embodiment of a biofilter having a concentric charge chamber.
Figure 20A:
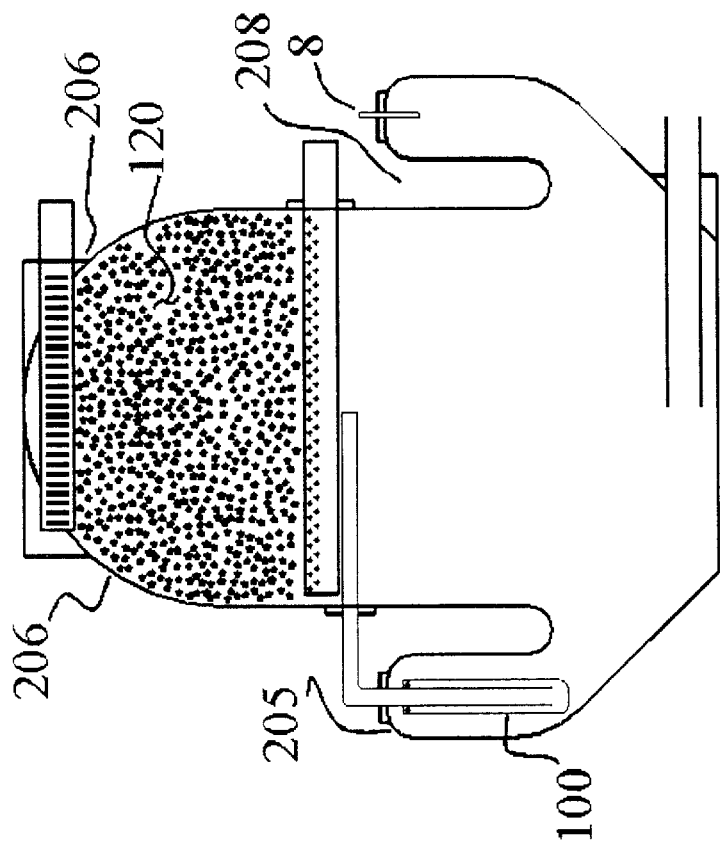

FIGS. 19 and 20 illustrate two similar designs which may be produced with one molding step. The hull in these figures may be molded as two identical halves which are then connected together in any conventional manner. While only a cross-section is shown in FIG. 19, it will be understood that the biofilter is a concentric design which can be visualized by rotating the cross-section along its vertical centerline. In FIG. 19, treated water outlet, wastewater inlet, and sludge removal line may be inserted as described before. The siphon 101 is of the external type previously described. It will be note that charge chamber 13 is formed in a ring-like wing 205 which encircles the lower filter chamber 191. It will be noted the upper filter chamber 190 in FIGS. 19 and 20 have a dome or cone shaped upper sections 206. Dome or cone shaped sections 206 are intended to prevent the media bed from becoming "wedged" into upper filter chamber 190 during the filtration cycle. This would prevent the media bed from being able to separate and move into lower filter chamber 191 during the backwash cycle. It can be seen that the sloping side walls of dome or cone shaped sections 206 are less like to hold the media bed in place during backwashing than would the vertical side walls of a square upper filter chamber 190. The slightly modified embodiment in FIG. 20 shows how concentric siphon 100 and air inlet 8 may be positioned within wing 205. FIG. 20 also illustrates how the biofilter design may be implemented to take into consideration ascetic characteristics. If the biofilter was to treat water from a koi pond or the like, the area 208 between the biofilter body and wing 205 could be filled with soil to accommodate flowers, plants or other decorative vegetation. In other envisioned configurations, the area 208 could be dramatically enlarged by increasing the diameter of the wing 205 effectively forming a double walled tank or pond with a centralized, integral filtration unit.

Figure 21B:
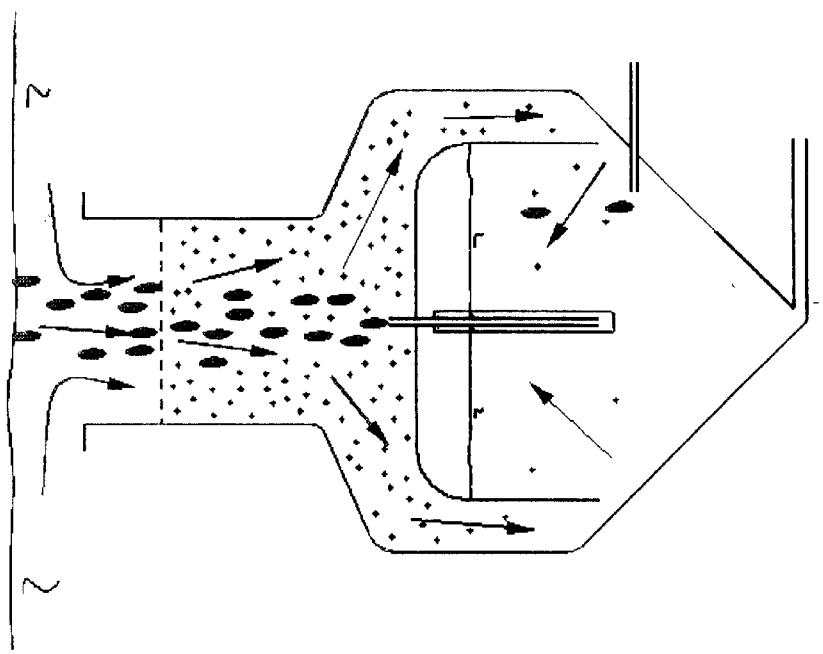
FIGS. 21a and 21b illustrate a biofilter which has a common influent inlet and effluent outlet.
Figure 21A:
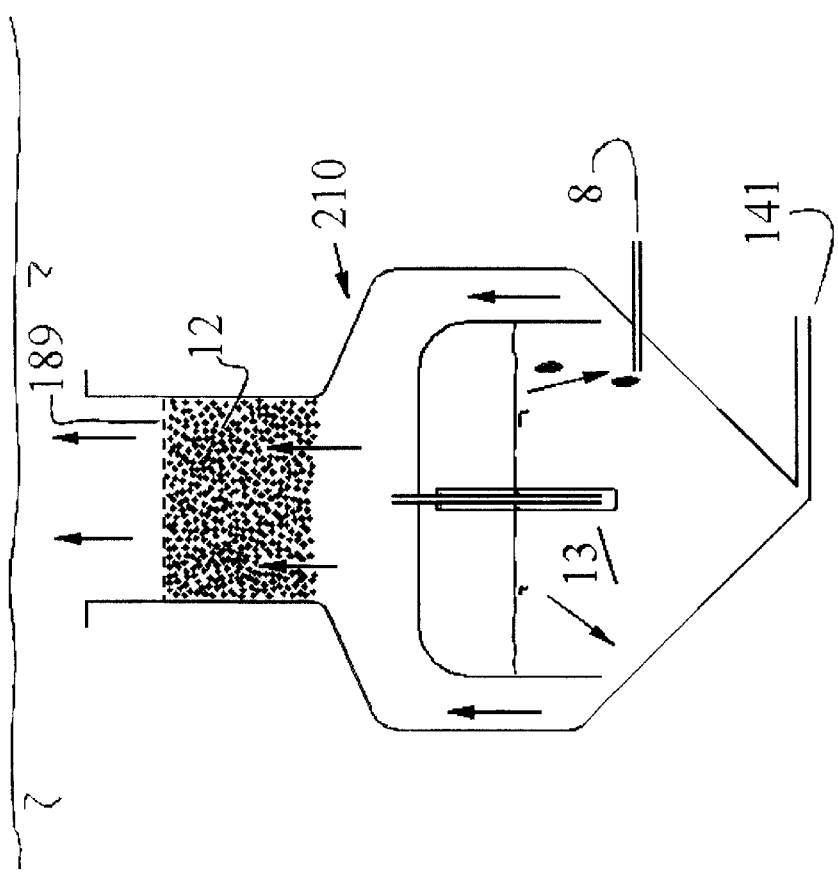

FIG. 21 shows a still further embodiment of the present invention which would be particularly economical way to treat water in low flow wastewater situations and lightly loaded aquariums and koi ponds. Biofilter 210 differs from previous embodiments in that the wastewater enters through the same inlet as treated water exits. Therefore, in this embodiment, the charge chamber will be positioned beneath the surface of the water being treated. During the filtration period seen in FIG. 21a, the air space growing in charge chamber 13 is forcing wastewater out of the lower part of the filter, through filter chamber 12 and out into the environment in which the filter is positioned. Upon backwashing, water is drawn back into filter chamber 13. It will be understood that charge chamber 13 will be sized large enough to accommodate not only the water in filter chamber 12, but also large enough to draw in a significant amount of water from the outer environment. Although V3/V1 ratios in the range of 1–2 may be applicable in specialized applications, V3/V1 ratios in the range of 5–10 or larger are considered desirable. In this manner, wastewater is pulled in through the filter chamber during the backwash cycle (while the media bed is fluidized) and then filtered through the reformed media bed during the filtration cycle. A sludge discharge 141 line will allow periodic removal of accumulated sludge.

Figure 22B:
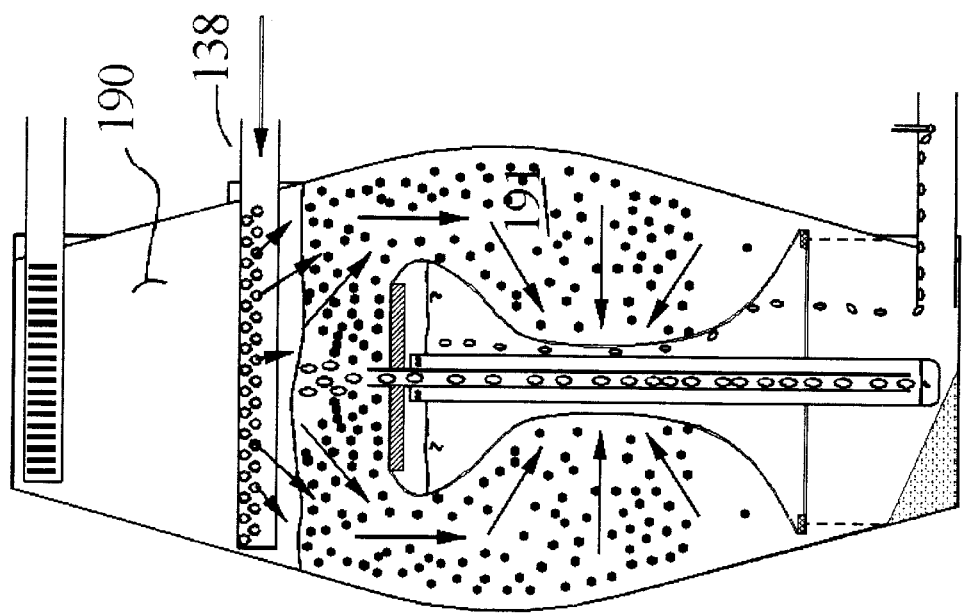
FIGS. 22a and 22b illustrate a biofilter having a collapsible charge chamber.
Figure 22A:
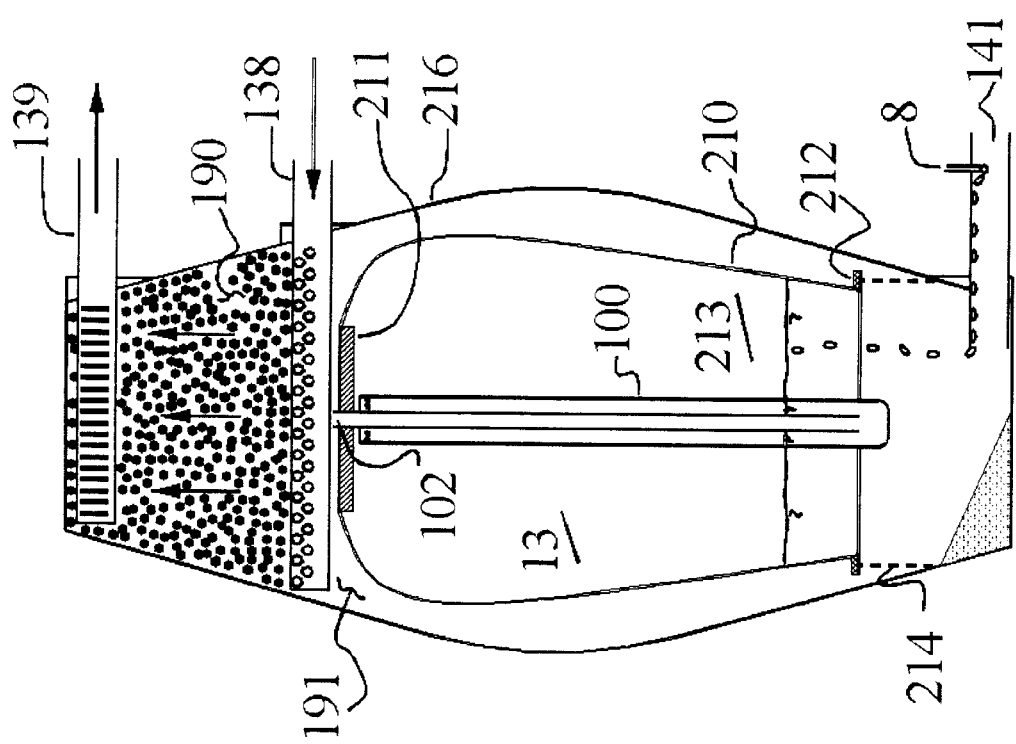

FIGS. 22a and 22b disclose another embodiment of the present invention. This embodiment of the biofilter differs from the previous in that the walls of charge chamber 13 are now formed of a substantially air impermeable flexible material 210. Flexible material 210 can be visualized as forming an upside down bag 213 positioned in the lower section of the biofilter. The open end or mouth of flexible bag 213 will be secured around its edges to anchor ring 212. Anchor ring 212 insures that the mouth of flexible bag 213 remains in a fixed position and remains fully open. Anchor ring 212 is supported above the bottom of the biofilter by a plurality of legs 214 space apart from one another. It will be understood that fluid in the biofilter may flow from the upper part of the biofilter, between legs 214 and into the mouth of bag 213. The closed end of bag 213 includes a rigid stiffener 211 formed therein. Positioned within bag 213 is concentric siphon 100. Siphon 100 may be fixed in position at its upper end by inner tubular member 102 extending through stiffener 211. An air inlet 8 may be positioned in any manner which will supply air to bag 213. In FIG. 22a, air is introduced into the sludge outlet line 141 where it may travel to the sludge intake area under bag 213 and then into bag 213.

In operation, watewater will enter the biofilter through wastewater inlet 138 and into upper filter chamber 190 as previously described. Also as before, air is continuously introduced into charge chamber 13 and forces the water level downward. When the water level reaches the point where the siphon is triggered, air begins to flow out of siphon 100 into upper filter chamber 190. As seen in FIG. 22b, flexible bag 213 begins to collapse, creating a space into which the agitated media beads and wash water may move. Additionally, the lateral pressure on bag 213 will tend to dynamically lower the bag 213, increasing the volume of lower filter chamber 191 and facilitating bead movement therein. It can be seen that the area which formerly held flexible bag 213 and acted as charge chamber 13 now serves the function of a temporary lower filter chamber 191. After the media beads have moved into the temporary lower filter chamber area 191, wastewater from inlet 138 will continue to flow into the biofilter and will gradually float the media beads back into their filtering bed position in upper filter chamber 190. It is envisioned that the media beads will have floated back into upper filter chamber 190 prior to the time when air being pumped into flexible bag 213 will have caused any significant expansion of bag 213. After the media bed is again reformed and filtering, the wash water will initially remain in the temporary lower filter chamber 191. However, as flexible bag 213 expands, lower filter chamber 191 will slowly lose volume and the water therein will be able to move into flexible bag 213 as shown in FIG. 22a. It can be seen in FIG. 22a that the biofilter hull 216 below inlet diffuser 138 is curved inward to narrow the distance between flexible bag 213 and hull 216. It is desirable to have the space between bag 13 and hull 216 as narrow as practical in order to isolate the lower area of the biofilter from upper filter chamber 190 during the filtration stage. Narrowing this space should aid in preventing inflowing wastewater from disturbing any settling solids in the low area of the biofilter.

Figure 23A:
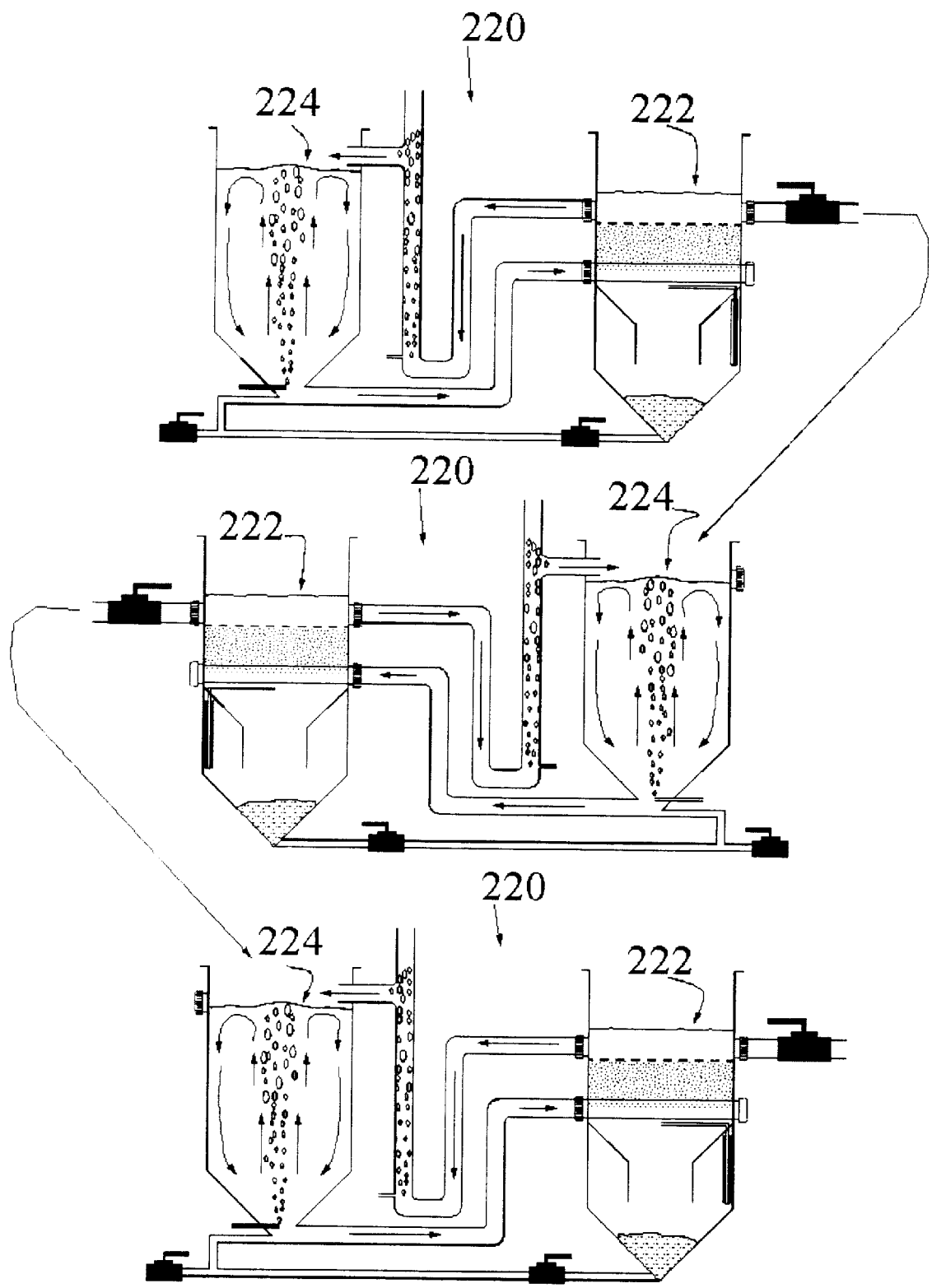
FIGS. 23a and 23b illustrate a multiple stage treatment system utilizing biofilters.
Figure 23B:
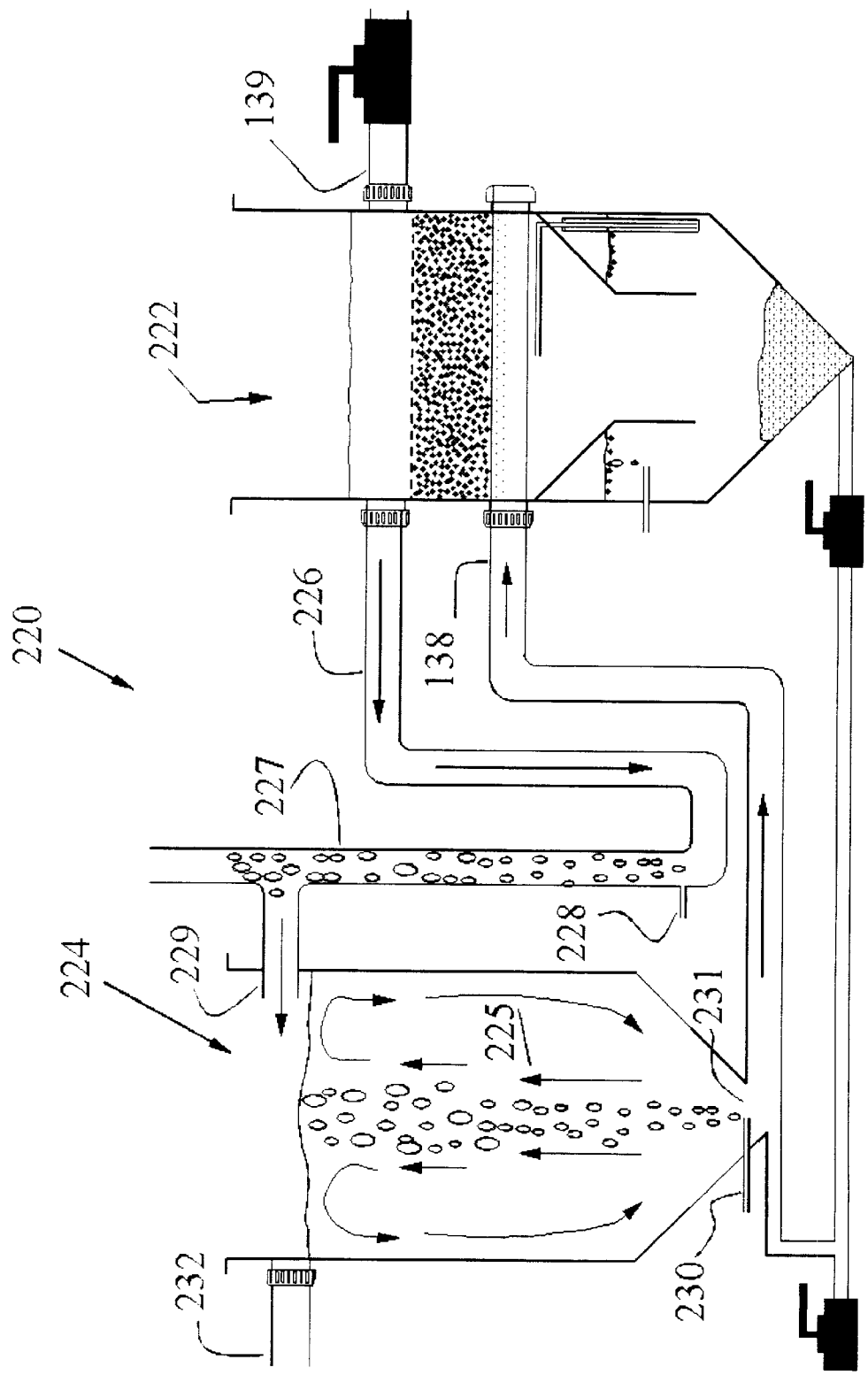

FIGS. 23a and 23b represents a multistage embodiment of the invention for the treatment of wastewater. FIG. 23a shows a system having three stages 220 with each of stages 220 comprising a biofilter 222 and an aerating basin 224. While three stages 220 are shown, the invention could be carried out with only two stages 220 or more than three stages 220. It can also be seen from FIG. 23a that each of the successive stages 220 are positioned schematically lower than the previous stage 220, thereby providing gravity flow through the system. FIG. 23b illustrates a single stage 220 in greater detail. Biofilter 222 is similar to the biofilter described in reference to FIG. 16. However, a certain quantity of wastewater flowing through biofilter 222 will be recirculated to aerating basin 224. After passing through the media bed of biofilter 222, part of the treated water will be directed through outlet 139 to the next stage 220 (or out of the system if the biofilter is in the last stage) and part of the treated water will be directed through recirculation outlet 226 into air pump 227. Air pump 227 is driven by air source 228 and moves the recirculated water into basin 225 by way of inlet 229. The water exiting inlet 229 has already been partially aerated passing through air pump 227 and will be further aerated in basin 225. Basin 225 is also receiving influent water from inlet 232. The wastewater could alternatively be introduced through inlet 138. This influent water may be the initial stream of incoming wastewater if basin 225 forms part of the first stage 220 or this influent water may be the treated effluent from a previous stage 220. In either case, the water entering basin 225 is aerated by way of air source 230 before exiting through basin outlet 231 and preceding to inlet 138 of biofilter 222. In some applications, the aeration provided by the air lift pump 227 may supply sufficient aeration, by diffuser design or through use of oxygen enriched air, to allow the elimination of the aerator component within basin 225 and/or the elimination of basin 225 as an element of the stage 220. In this latter case, water exiting inlet 229 can be directed immediately to inlet 138.

It will be understood that in each stage 220, various parameters of biofilter 222 may differ from the parameters of the biofilters 222 in other stages 220. For example, the first stage 220 is expected to encounter heavy loads of large particles (over 50–100 um in diameter) and will be used primarily to filter out the large particles and BOD associated with those particles. Since biofouling from the large solids loading is the primary concern, it will be desirable to used rounded media beads as discussed above. It is estimated that the interval between backwashing should be approximately 0.5 to 2 hours. Typical influent entering the first stage 220 may have 150 mg/l total suspended solids (TSS) and 200 mg/l BOD. The first stage 220 should reduce the TSS to below 50 mg/l and the BOD to below 100 mg/l.

The second stage 220 will be designed to eliminate the remaining particulate BOD and reduce the soluble BOD which would not have been effectively treated in first stage 220. Second stage 220 will reduce BOD primarily through biological activity as opposed to filtering. Since biofilter 222 will be treating significant concentrations of soluble BOD, it is desirable to use the beads with protected external biofloc spaces. Additionally, the high state of biological activity requires higher amounts of oxygen be delivered to the media bed. Therefore, it may be desirable to diffuse an oxygen rich gas into aeration basin 224 rather than simply air. A backwashing interval of 1–2 hours is believed desirable. Second stage 220 is expected to reduce the soluble BOD to a range of 20 to 30 mg/l BOD.

Third stage 220 will be designed to reduce the remaining BOD to 5 to 10 mg/l and TAN from approximately 15 mg/l to less than 1 mg/l through extended biological treatment of the wastewater. It will be advantageous to used beads providing protected internal biofloc spaces. While the oxygen demand will not be as high as the second stage 220, the third stage backwashing will be less frequent and less vigorous than the previous stages.

In addition to the stages 220 discussed above, conventional pretreatment techniques may be employed prior to the wastewater reaching the first stage 220. These pretreatment stages are well known in the art and could include bar screens, grit chambers, and floatation chambers to remove oil and grease.

Finally, while many parts of the present invention have been described in terms of specific embodiments, it is anticipated that still further alterations and modifications thereof will no doubt become apparent to those skilled in the art. Nothing in the specification should be considered a size limitation on how large or small the biofilter may be. It is envisioned that filters having much less than 1 ft$^3$ of filter media could be used to filter aquariums while filters having well over 100 ft$^3$ or even many times that amount of filter media could be employed in industrial or domestic wastewater applications. Nor should the specific embodiments be interpreted as a limitation on the geometric configuration of the biofilter. The present invention could take on any number of widely differing geometric configurations as illustrated by the differences between the embodiments of FIGS. 1 and 23. It is therefore intended that the following claims be interpreted as covering all such alterations and modifications as fall within the true spirit and scope of the invention.

What is claimed is:

1. A floating media filter comprising:
   a. a filter chamber having a volume to accommodate filter media;
   b. a charge chamber for storing air, said charge chamber being fluidly connected to said filter chamber and having:
      i. an air outlet for admitting air into said filter chamber;
      ii. an air inlet; and
   c. a trigger for selectively allowing the passage of air through said air outlet.

2. A floating media filter according to claim 1, wherein said trigger is a concentric siphon.

3. A floating media filter according to claim 2, wherein said concentric siphon includes an inner body having a first fluid passage communicating with a second fluid passage formed in an outer body.

4. A floating media filter according to claim 3, wherein said first fluid passage communicates with said filter chamber and said second fluid passage surrounds at least a portion of said inner body.

5. A floating media filter according to claim 3, wherein said first fluid passage communicates at a first end with said filter chamber and communicates at a second end with said second fluid passage of said outer body.

6. A floating media filter according to claim 5, wherein said outer body has an inlet allowing fluid communication between said charge chamber and said first passage of said inner body.

7. A floating media filter according to claim 3, wherein said outer body has an inlet allowing fluid communication between said charge chamber and said first passage of said inner body.

8. A floating media filter according to claim 7, wherein said concentric siphon is positioned external to said charge chamber and has a line communicating with said charge chamber.

9. A floating media filter according to claim 8, wherein said concentric siphon has a line communicating with said filter chamber.

10. A floating media filter according to claim 2, wherein a bottom of said concentric siphon extends downward to a level adjacent a bottom of said charge chamber.

11. A floating media filter according to claim 10, wherein said bottom of said concentric siphon is positioned 1/16 to 1/4 of an inch above said bottom of said charge chamber.

12. A floating media filter according to claim 1, wherein said filter chamber and said charge chamber form an unitary filtration module allowing said filtration module to be removably positioned within a cavity formed in a tank body.

13. A floating media filter according to claim 12, wherein said tank body has a shoulder sized to support a lip formed on said filtration module.

14. A floating media filter according to claim 12, wherein said filtration module is formed from a hollow tubular member, said tubular member further having:
   i) a first wall creating a space exterior to said filter chamber and an interior space of said filter chamber;
   ii) a wall dividing said filter chamber and said charge chamber;
   iii) said trigger device communicating between said charge chamber and said filter chamber; and
   iii) said filter chamber having an opening allowing fluid to communicate between said space exterior to said filter chamber and said interior space of said filter chamber.

15. A floating media filter according to claim 14, wherein said filter chamber includes an upper portion sized to accommodate a bed of floating media when said floating media is in a non-fluidized state.

16. A floating media filter according to claim 15, wherein said opening allowing fluid communication is positioned below said upper portion of said filter chamber, thereby forming a bottom to top flow path through said bed of filter media.

17. A floating media filter according to claim 16, wherein said opening allowing fluid communication is formed from a by a plurality of apertures formed in said first wall between said exterior and interior spaces.

18. A floating media filter according to claim 15, wherein said opening allowing fluid communication is positioned along said upper portion of said filter chamber, thereby forming a side to center flow path through said bed of filter media.

19. A floating media filter according to claim 18, wherein said opening allowing fluid communication is formed from a by a plurality of apertures formed in said wall between said exterior and interior spaces.

20. A floating media filter according to claim 18, wherein an outlet conduit extends into said bed of filter media.

21. A floating media filter according to claim 20, wherein said outlet conduit includes a pipe with a plurality of apertures formed therein.

22. A floating media filter according to claim 18, wherein an airlift pump is positioned at least partially within said filter chamber, thereby inducing said side to center flow.

23. A floating media filter according to claim 14, wherein said opening allowing fluid communication is formed from a screen-like material.

24. A floating media filter according to claim 1, wherein said filter includes:
   a) an influent inlet;
   b) an effluent outlet;
   c) a sludge discharge outlet; and
   d) a bed of floating filter media.

25. A floating media filter according to claim 1, wherein an aeration device is positioned within said floating media filter.

26. A floating media filter according to claim 25, wherein said aeration device is at least partially positioned within said filter chamber.

27. A floating media filter according to claim 26, wherein said aeration device is tubular member extending into said filter chamber.

28. A floating media filter according to claim 27, wherein said tubular member includes a plurality of apertures formed therein and an air source introduces air in a lower portion of said tubular member, thereby forming an airlift pump.

29. A floating media filter according to claim 25, wherein said aeration device is an airlift pump.

30. A floating media filter according to claim 25, further including recirculation ports allowing at least portion of treated water exiting said filter chamber to be returned to said filter chamber.

31. A floating media filter according to claim 30, wherein said re-circulation ports are sized to return a portion of treated water equal to qr=nQ, where qr is the returned flow, Q is effluent flow, and h is a real number greater than one.

32. A floating media filter according to claim 1, wherein said charge chamber is a collapsible charge chamber formed of a flexible, significantly air impermeable material.

33. A floating media filter according to claim 32, wherein s aid collapsible charge chamber operates between an expanded and a collapsed state, said collapsible charge chamber in said expanded state and said filter media in a nonfluidized state occupying a majority of a volume defined by said charge chamber and said filter chamber.

34. A floating media filter according to claim 32, wherein said collapsible charge chamber operates between an expanded and a collapsed state and said floating media filter includes a seal engaged by said collapsible charge chamber when in said expanded state.

35. A floating media filter according to claim 1 wherein said charge chamber is positioned laterally with respect to said filter chamber.

36. A floating media filter according to claim 35, wherein said charge chamber extends conentrically around said filter chamber.

37. A floating media filter according to claim 1, wherein a wastewater inlet tube extends into said filter chamber.

38. A floating media filter according to claim 37, wherein said wastewater inlet tube extends through said filter chamber.

39. A floating media filter according to claim 37, wherein said wastewater inlet tube is positioned below a bed of filter media when said filter media is in a non-fluidized state.

40. A floating media filter according to claim 39, wherein said bed has a lower surface and said inlet tube has outlet apertures position to direct wastewater at an angle to said lower surfaces.

41. A floating media filter according to claim 1, wherein a plurality of said floating media filters are positioned serially in a wastewater stream.

42. A floating media filter according to claim 41, wherein at least one of said plurality of floating media filters includes an aeration basin fluidly attached thereto.

43. A floating media filter according to claim 42, wherein each of said plurality of floating media filters includes an aeration basin fluidly attached thereto.

44. A floating media filter according to claim 43, wherein a portion of wastewater being treated by said filters is recirculated from said filters into said aeration basins.

45. A floating media filter according to claim 42, wherein a portion of wastewater being treated by said filter is recirculated from said filter into said aeration basin.

46. A floating media filter according to claim 44, wherein a portion of wastewater being treated by said filter is recirculated through said filter chamber at least once.

47. A floating media filter according to claim 1, wherein said filter chamber has a first area through which treated effluent exits said filter chamber and a second area through which influent enters said filter chamber, said first and second areas at least partially overlap.

48. A floating media filter according to claim 47, wherein said first area and said second area are the same.

49. A floating media filter according to claim 47, wherein said filter chamber is positioned beneath the surface of a body of wastewater.

50. A floating media filter according to claim 47, wherein said charge chamber is 2 to 20 times larger than said filter chamber.

51. A floating media filter according to claim 1, wherein said filter chamber comprises an upper filter chamber and a lower filter chamber, said lower filter chamber having walls forming a funnel shaped area.

52. A floating media filter according to claim 1, wherein said filter chamber has a plurality of sides and at least one side is enclosed by a screen material.

53. A system providing treatment of wastewater, said system comprising:

a) a holding basin for the storage of wastewater;
b) a floating media filter positioned in fluid communication with wastewater in said holding basin, said filtration unit including:
   i. a filter chamber;
   ii. a charge chamber for storing air, said charge chamber being fluidly connected to said filter chamber and having an air outlet for admitting air into said filter chamber and an air inlet; and
   iii. a trigger for selectively allowing the passage of air through said air outlet.

54. A system according to claim 53, wherein said floating media filter is positioned within said holding basin.

55. A system according to claim 54, wherein said filter chamber and said charge chamber form an unitary filtration module allowing said filtration module to be removably positioned within said holding basin.

56. A system according to claim 54, wherein said floating media filter has an open bottom section allowing a flow of wastewater to enter said filter chamber from said bottom section.

57. A system according to claim 54, wherein said floating media filter has a sloping bottom member and a sludge orifice formed at a lower end of said bottom member.

58. A system according to claim 54, wherein said floating media filter includes a sludge deflector positioned below said sludge orifice.

59. A system according to claim 58, wherein said sludge deflector selectively moves against and away from said sludge orifice, thereby selectively opening and closing said sludge orifice.

60. A system according to claim 59, wherein said sludge deflector opens said sludge orifice shortly before a backwash cycle begins and closes said sludge orifice shortly after said backwash cycle begins.

61. A system according to claim 59, wherein said sludge deflector is a floatable sludge deflector.

62. A system according to claim 59, wherein said sludge deflector is connected to a float extending into said charge chamber.

63. A system according to claim 62, wherein a connection distance between said sludge deflector and float causes said sludge deflector to open said sludge orifice shortly before a backwash cycle begins and to close said sludge orifice shortly after said backwash cycle begins.

64. A system according to claim 53, wherein said floating media filter is positioned outside of said holding basin.

65. A system according to claim 53, wherein said holding basin is a primary treatment stage and said floating media filter forms a secondary treatment stage.

66. A system according to claim 53, wherein said floating media filter has a wastewater inlet positioned adjacent to said filter chamber.

67. A system according to claim 53, wherein said floating media filter includes a pressure cover positioned over said filter chamber, said pressure cover communicating with a downflow induction aperture in order to allow controlled release of air through said pressure cover.

68. A system according to claim 67, the rate of said release of air is controlled by a diameter of said downflow induction aperture.

69. A floating media filter according to claim 53, wherein wastewater in said holding basin is maintained at a height above an effluent discharge outlet of said filter, thereby inducing gravity flow of said wastewater through said filter.

70. A floating media filter according to claim 69, wherein said filter is positioned inside said holding basin.

71. A floating media filter according to claim 53, wherein said filter is positioned inside said holding basin.

72. A floating media filter comprising:
a. a filter chamber having a volume of filter media;
b. a charge chamber for storing air, said charge chamber being fluidly connected to said filter chamber and having:
   i. an air outlet for admitting air into said filter chamber;
   ii. an air inlet;
c. a trigger for selectively allowing the passage of air through said air outlet;
d. a effluent outlet communicating with said filter chamber; and
e. a influent inlet communicating with said filter chamber.

73. A floating media filter according to claim 72, wherein at least a portion of said charge chamber is positioned at an elevation lower than said filter chamber.

74. A floating media filter according to claim 72, wherein said trigger is a siphon.

75. A floating media filter according to claim 74, wherein said siphon is a concentric siphon.

76. A floating media filter according to claim 72, wherein said filter chamber and said charge chamber is positioned within a filter housing.

77. A floating media filter according to claim 72, wherein said filter chamber and said charge chamber form an unitary filtration module allowing said filtration module to be removably positioned within a cavity formed in a tank body.

78. A floating media filter according to claim 72, wherein a screen is position therein to limit the downward movement of said filter media.

79. A floating media filter according to claim 72, wherein said filter is positioned in fluid communication with a water storage basin.

80. A floating media filter according to claim 79, wherein said filter is positioned within said water storage basin.

81. A method of backwashing the filter media in a floating media biofilter having a filter chamber with waste water flowing therethrough, a charge chamber, and a trigger for selectively allowing the transfer of air between said filter chamber and said charge chamber, said method comprising the steps of:
a. introducing air into said charge chamber while said trigger does not allow any substantial transfer of air between said filter chamber and said charge chamber;
b. activating said trigger to allow air to flow from said charge chamber to said filter chamber at a rate sufficient to agitate said floating media;
c. deactivating said trigger to prevent any substantial transfer of air between said charge chamber and said filter chamber; and
d. removing from said biofilter treated waste water exiting from said filter chamber.

82. A method according to claim 81 wherein said steps of activating and deactivating said trigger are accomplished using a siphon.

83. A method according to claim 81, wherein said filter chamber and said charge chamber are positioned within a water storage basin.

84. A method according to claim 81, wherein a portion of treated waste water exiting said filter chamber is recirculated to said filter chamber.

85. A method according to claim 81, wherein said filter chamber has a pressure cover and an air pocket is temporarily formed in an upper portion of said air pocket during a backwash cycle.

* * * * *